US010668866B2

(12) United States Patent
Kuschmeader et al.

(10) Patent No.: US 10,668,866 B2
(45) Date of Patent: Jun. 2, 2020

(54) HITCH-MOUNTED BICYCLE CARRIER

(71) Applicant: Kuat Innovations, LLC, Springfield, MO (US)

(72) Inventors: Luke Kuschmeader, Battlefield, MO (US); Michael Buis, Springfield, MO (US); Jordan K. Bowles, Ozark, MO (US); Joshua H. Schwartz, Springfield, MO (US); Aaron A. Houston, Nixa, MO (US)

(73) Assignee: KUAT INNOVATIONS, LLC, Springfield, MO (US)

( * ) Notice: Subject to any disclaimer, the term of this patent is extended or adjusted under 35 U.S.C. 154(b) by 0 days.

(21) Appl. No.: 15/706,378

(22) Filed: Sep. 15, 2017

(65) Prior Publication Data
US 2018/0072237 A1    Mar. 15, 2018

Related U.S. Application Data

(60) Provisional application No. 62/395,172, filed on Sep. 15, 2016.

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC ........ B60R 9/10; Y10S 224/924; B60D 1/241
(Continued)

(56) References Cited

U.S. PATENT DOCUMENTS 5,052,605 A * 10/1991 Johansson ................. B60R 9/10
                                                                    224/324
5,527,146 A *  6/1996 Allsop ....................... B60R 9/06
                                                                    224/319
(Continued)

FOREIGN PATENT DOCUMENTS

CN          203331973 U  * 12/2013
CN          205916047 U  *  2/2017
(Continued)

OTHER PUBLICATIONS

NV Video, https://www.youtube.com/watch?v=Ind6VGiRRRE, Feb. 14, 2013 (4 Screen Captures).*
(Continued)

*Primary Examiner* — Scott T McNurlen
(74) *Attorney, Agent, or Firm* — Kutak Rock LLP; James H. Jeffries

(57) ABSTRACT

The present disclosure includes hitch-mounted carriers, including portable bicycle racks. One carrier may include front tire tray assembly; hook arm assembly; pivot assembly; hitch shank ball cam assembly; rear tire tray assembly; and a bike docking assembly. The pivot assembly allowing for adjustment between: storage, trunk access, and use configurations. The bike carrier having first and second wheel supporting tray assemblies for supporting wheels of a loaded bicycle. A hook arm assembly may be pivotally arranged relative to lock at least one wheel and ratchet clamped to at least one wheel. The hook arm assembly may also be configured to extend and retract and is frictionally locked into position. The bike carrier may include a docking assembly having inner and outer clamps configured to the hold a bike into position such that mechanical work may be accomplished at an elevated height.

20 Claims, 28 Drawing Sheets

(58) Field of Classification Search
USPC ....... 224/924, 282, 502, 504–505, 553, 519, 224/521; 70/18, 233–236; 280/506
See application file for complete search history.

(56) References Cited

U.S. PATENT DOCUMENTS

| | | | |
|---|---|---|---|
| 7,044,347 B1* | 5/2006 | Pedrini | B60R 9/10 224/324 |
| 8,136,709 B2 | 3/2012 | Jeli et al. | |
| 8,141,760 B2 | 3/2012 | Kuschmeader et al. | |
| 8,596,664 B2* | 12/2013 | Lahn | B60D 1/06 280/495 |
| 9,764,610 B2* | 9/2017 | McCall | B60D 1/06 |
| 2012/0125964 A1* | 5/2012 | Sautter | B60R 9/06 224/497 |
| 2014/0124551 A1* | 5/2014 | Condon | B60R 9/10 224/324 |
| 2016/0068110 A1* | 3/2016 | Prescott | B60R 9/10 224/521 |
| 2016/0068111 A1 | 3/2016 | Walker et al. | |
| 2018/0022286 A1* | 1/2018 | Settelmayer | E05B 71/00 |

FOREIGN PATENT DOCUMENTS

| | | | |
|---|---|---|---|
| CN | 206067650 U | * | 4/2017 |
| CN | 206067651 U | * | 4/2017 |

OTHER PUBLICATIONS

Kuatracks.com, visited via Wayback Machine (Six Screen Captures, Sep. 3-Sep. 6, 2015) (Year: 2015).*
Jimlangley.blogspot.com, "Product Review: Kuat NV hitch 2-bike rack (2-inch hitch model)", posted Nov. 10, 2013 (Year: 2013).*
crvownersclub.com, "Kuat NV bike rack review", posted Aug. 21, 2012 (Year: 2012).*

* cited by examiner

HITCH-MOUNTED BICYCLE CARRIER

This application claims the benefit of priority to U.S. Provisional Application No. 62/395,172, filed Sep. 15, 2016, which are incorporated herein by reference.

BACKGROUND

The present invention relates generally to portable racks, and specifically to hitch-mounted carriers.

Bicycles, skis, snowboards, and other large devices often must be transported to a location before being used for travel or recreation. As it is often impractical, undesirable, or impossible to carry these items inside a vehicle, various racks have been created for coupling these items to vehicles for exterior travel. Conventional bicycle carrier equipment can be roof mounted, trunk mounted, or hitch mounted to the vehicle.

A disadvantage of these bike carriers, however, is that they are generally bulky and take up a lot of space either on the roof or rear portion of the vehicle. Additionally, hitch mounted bike carriers for multiple bikes take up a large relative amount of space that is undesirable for the user when the carriers are not being utilized to transport or store bicycles.

Known bike carriers may also suffer from a large number of disadvantages which make it inconvenient for a user to transport or store at least one bike thereon. Current bike carriers often are limited by the size of the bike which can be operatively attached with such bike carrier. If the bike does not fit, these bike carriers typically provide no adjustability.

Novel and unobvious hitch-mounted carriers are set forth herein, as will be evident from reviewing the description below and the accompanying drawings.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment a hitch-mounted bicycle carrier may include a hitch attachment assembly having opposed first and second ends; a support member rotatably coupled to the hitch attachment assembly first end for movement; a latch bar having a body, the body having a protrusion; at least two opposed plates being connected to the support member, the hitch attachment assembly, and the latch bar, each plate having a body, and at least one of the at least two plate bodies having at least two depressions, wherein the protrusion of the latch bar is configured to be temporarily captured therein; and a foot pedal connected to the latch bar; wherein manipulation of the foot pedal manipulates the protrusion of the latch bar between the at least two depressions, and wherein when the latch bar protrusion is temporarily captured within a depression.

In a further embodiment of the hitch mounted bike carrier, the support member and the hitch attachment assembly are configured to be manipulated into first and second configurations, the first configuration being where the hitch attachment assembly and the support member are generally perpendicular; a second configuration being where the hitch attachment assembly and the support member are generally parallel.

In another embodiment of the hitch mounted bike carrier, the body of the plate may further include a seating surface, the seating surface enabling the support member and the hitch attachment assembly to be further configured to be manipulated into a third configuration, wherein in the third configuration the support member is at a traverse angle with respect to the hitch attachment assembly and the latch bar is positioned on the seating surface. The support member position in the third configuration may be at an acute angle (i.e. 40 degrees) from a support member position in the second configuration.

In one embodiment, the hitch-mounted bicycle carrier may further include a spring connected at one end thereof engaging the protrusion of the latch bar and biases the latch bar in a direction, such that the protrusion of the latch bar is temporarily captured within the first and second depressions.

In a further embodiment, the hitch mounted bike carrier may include a front tire tray assembly and a rear tire tray assembly, each being traverse to a direction of the support member, each being located on opposed sides of the support member and each configured to position a wheel of a bike thereon.

In another embodiment of the hitch mounted carrier, the support member, hitch attachment assembly, front tire tray assembly and a rear tire tray assembly are constructed of at least one of aluminum, plastic, and carbon fiber.

In one embodiment, the front tire tray assembly may include a housing and first and second front tire support members, each support member having a generally U-shaped inner seat surface, wherein the U-shaped inner seat surface is configured to hold a tire. The first and second front tire support members may be separated by an elongate curved connecting rod, and wherein the first support member is rotatably coupled to the front tire tray assembly housing.

In another embodiment, the hitch mounted bike carrier may further include a strap assembly, the strap assembly being positioned on the rear tire assembly and including a clamp and a strap.

In a further embodiment, the hitch-mounted bicycle carrier may further include a cable lock assembly, the cable lock assembly being housed within the rear tire assembly and including a cable and a lock, wherein the cable passes through the lock to secure the cable and lock assembly. The cable lock assembly may further include a slider having a body with first and second parallel apertures running through the body, and the cable of the cable lock assembly may include of at least first and second separate cords, wherein the first and second cords pass slideably through the respective first and second parallel apertures of the slider when the cable lock assembly is housed within the rear tire tray assembly.

In still another embodiment, the hitch-mounted bicycle carrier may further include a hook arm assembly, the hook arm assembly being rotatably coupled to at least one of the rear tire tray assembly and the front tire tray assembly at a first end, the hook arm assembly having a tubular elongate arm with a hooked component at a second end, the hooked component being configured to temporarily capture a wheel of a bike therewith. The hook arm assembly may further include: a button positioned at the second end of the hook arm assembly; an inner portion housed within the elongate arm; a ratchet pawl engaging ridges of a ratchet rack, the ratchet rack and pawl positioned within the tubular elongate arm, the ratchet pawl connected to the inner tube and configured to hold the inner portion at a point along the ratchet rack wherein the pawl is situated in the ridges of the ratchet rack; a rod connected to the button on a first end of the rod and the ratchet pawl at a second end of the rod, the button being configured to adjust the ratchet pawl along the ridges of the ratchet rack, thereby manipulating a length of the hook arm assembly by at least one of elongating the inner portion of the hook arm assembly and retracting the inner portion of the hook arm assembly. The hook arm assembly may further include a first torsion spring biasing the ratchet pawl in a direction, such that the ratchet pawl is temporarily captured within the ridges of the ratchet rack. The hook arm assembly may be frictionally coupled to at least one of the rear tire tray assembly and the front tire tray assembly at a first end, such that when the hook arm assembly is pivoted to a location, the hook arm assembly is frictionally held in the selected location.

In another embodiment, the hitch attachment assembly may further include: a tubular housing having first and second halves, the tubular housing having an aperture for which a ball may be captured therein; a rotatable knob located at the first half of the housing and connected to a rod, the rod located within the tubular housing; a cam block located within the housing on the second half of the housing and being elongate and having a groove running parallel with the tubular housing, the groove having a ramp at a first cam block end, and wherein the ball engages the groove, the cam block also having an elongate aperture for which a bolt passes through; and wherein when the knob is rotated the cam block is shifted to and away from the knob and the ball rotates about the groove in an opposite direction from the cam block until at least one of the following occurs: the bolt engages a side of the elongate aperture and the ball engages the ramp.

In one embodiment, the hitch-mounted bicycle carrier may further include a docking assembly, the docking assembly rotatably coupled to the support member, the docking assembly may include: a tubular housing with a first end and a second end; an inner portion positioned within the housing of the docking assembly; a ratchet pawl engaging ridges of a ratchet rack, the ratchet rack and pawl positioned within the housing of the docking assembly, the ratchet pawl connected to the inner portion and configured to hold the inner portion at a point along the ratchet rack wherein the ratchet pawl is temporarily captured in the ridges of the ratchet rack; a clamp assembly including a fixed jaw arm and moveable jaw, wherein the fixed jaw is connected to the tubular housing at the first end, and the moveable jaw is connected to the inner portion; a knob is connected to the moveable jaw of the clamp; a rod connected to the knob at a first end of the rod and to the ratchet pawl at a second end of the rod and positioned through the inner portion and the fixed and moveable jaws of the clamp, such that manipulation of the rod manipulates the ratchet pawl; and wherein the knob being configured to rotate or pushed inward with some force adjusts the ratchet pawl along the ridges of the ratchet rack, thereby manipulating a distance between the fixed jaw and the moveable jaw of the clamp assembly by at least one of elongating the inner portion of the docking assembly and retracting the inner portion of the docking assembly. The docking assembly may further include a first torsion spring biasing the ratchet pawl in a direction, such that the ratchet pawl is temporarily captured within the ridges of the ratchet rack. The knob of the docking assembly may be a first knob and the docking assembly may further include a second knob being configured to restrict rotation of the tubular housing of the docking assembly.

In another embodiment, the docking assembly is removeably coupled to the support member, and configured to be utilized with a separate stand.

In a further embodiment, a hitch-mounted bicycle carrier may include: a hitch attachment assembly having opposed first and second ends; a support member rotatably coupled to the hitch attachment assembly first end; a front tire tray assembly being located along a first side of the support member and configured to position a wheel of a bike thereon; a rear tire tray assembly being located along a second side of the support member being opposed to the first side, the rear tray assembly being aligned with the front tire assembly and configured to position a wheel of a bike thereon; and a docking assembly, the docking assembly rotatably coupled to the support member, the docking assembly may include: a tubular housing with a first end and a second end; an inner portion positioned within the housing of the docking assembly; a ratchet pawl engaging ridges of a ratchet rack, the ratchet rack and pawl positioned within the housing of the docking assembly, the ratchet pawl connected to the inner portion and configured to hold the inner portion at a point along the ratchet rack wherein the ratchet pawl is temporarily captured in the ridges of the ratchet rack; a clamp assembly including a fixed jaw arm and moveable jaw, wherein the fixed jaw is connected to the tubular housing at the first end, and the moveable jaw is connected to the inner portion; a knob is connected to the moveable jaw of the clamp; a rod connected to the knob at a first end of the rod and to the ratchet pawl at a second end of the rod and positioned through the inner portion and the fixed and moveable jaws of the clamp, such that rotation of the rod manipulates the ratchet pawl; and wherein the knob being configured to rotate and adjust the ratchet pawl along the ridges of the ratchet rack, thereby manipulating a distance between the fixed jaw and the moveable jaw of the clamp assembly by at least one of elongating the inner portion of the docking assembly and retracting the inner portion of the docking assembly.

In one embodiment, a hitch-mounted bicycle carrier may include: a hitch attachment assembly having opposed first and second ends; a support member rotatably coupled to the hitch attachment assembly first end; a front tire tray assembly being located along a first side of the support member and configured to position a wheel of a bike thereon; a rear tire tray assembly being located along a second side of the support member being opposed to the first side, the rear tray assembly being aligned with the front tire assembly and configured to position a wheel of a bike thereon; and a hook arm assembly, the hook arm assembly being rotatably coupled to at least one of the rear tire tray assembly and the front tire tray assembly at a first end, the hook arm assembly having a tubular elongate arm with a hooked component at a second end, the hooked component being configured to temporarily capture a wheel of a bike therewith.

BRIEF DESCRIPTION OF THE DRAWINGS

The drawings constitute a part of this specification and may include exemplary embodiments of the present invention and illustrate various objects and features thereof.

A further understanding of the invention may be had by reference to the accompanying drawing in which.

DETAILED DESCRIPTION

Figure 1:
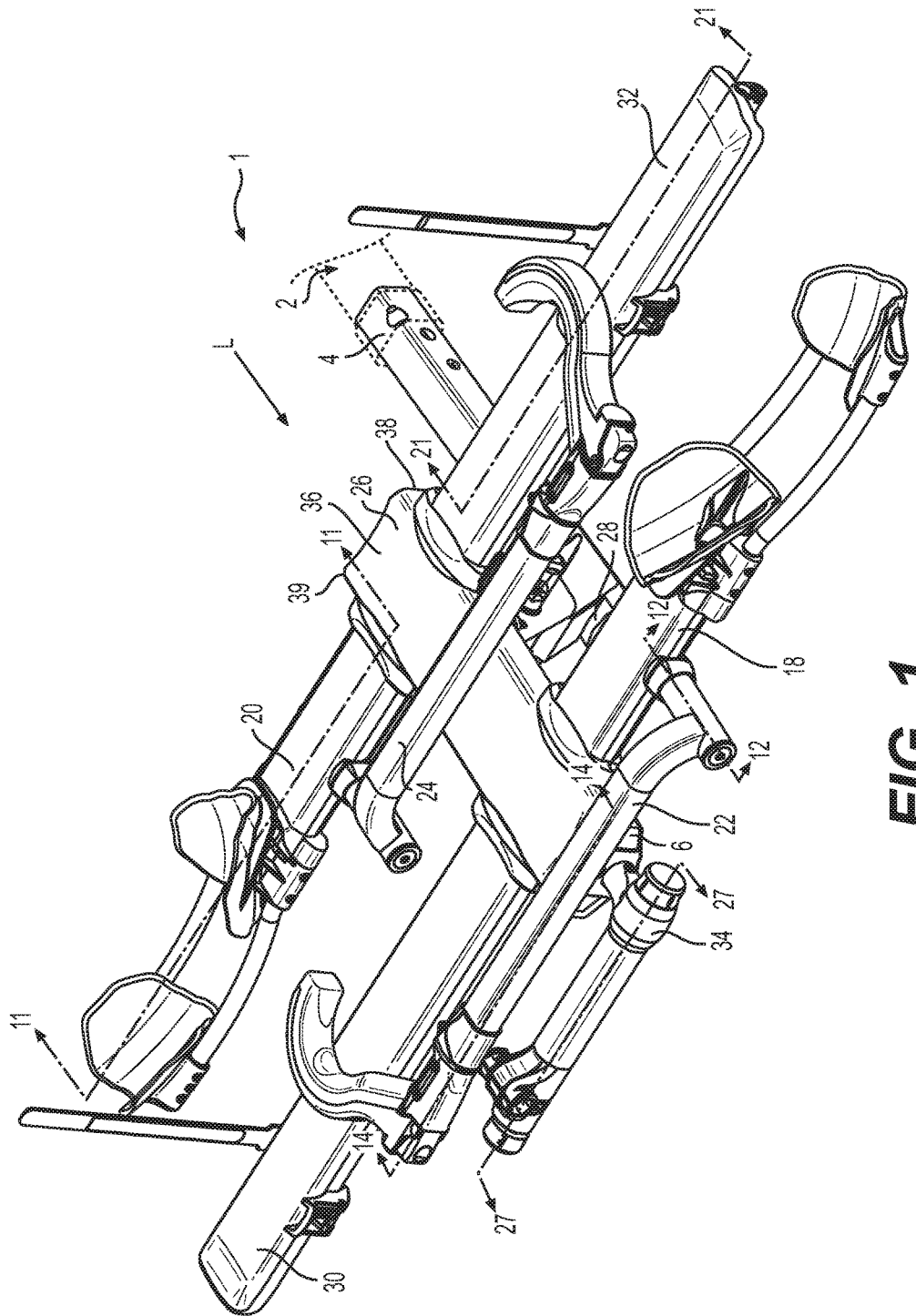
FIG. 1 is a perspective view of a hitch-mounted carrier according to an embodiment with a portion of a hitch or mount shown in phantom.
Figure 2:
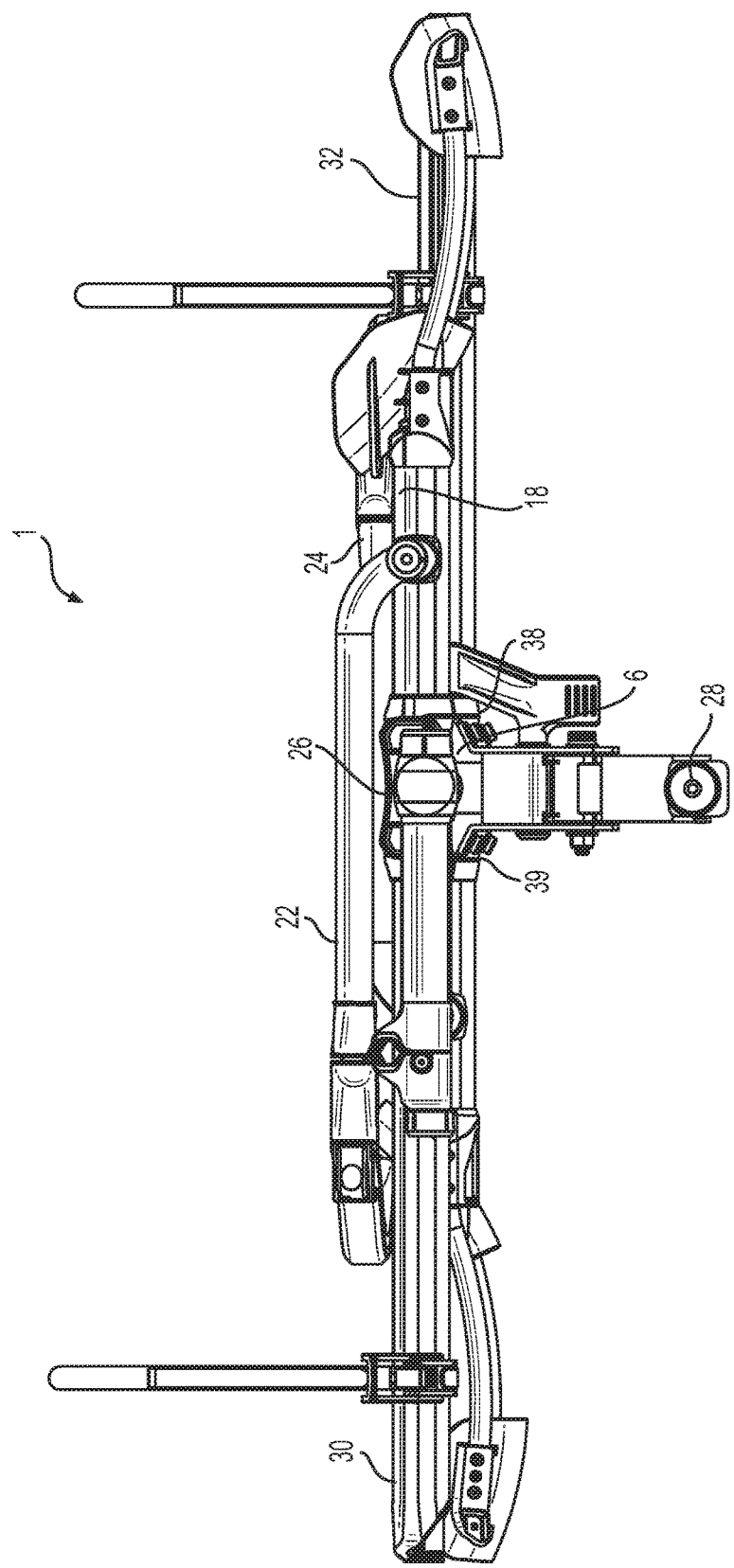
FIG. 2 is a front view of the hitch-mounted carrier of FIG. 1.
Figure 3:
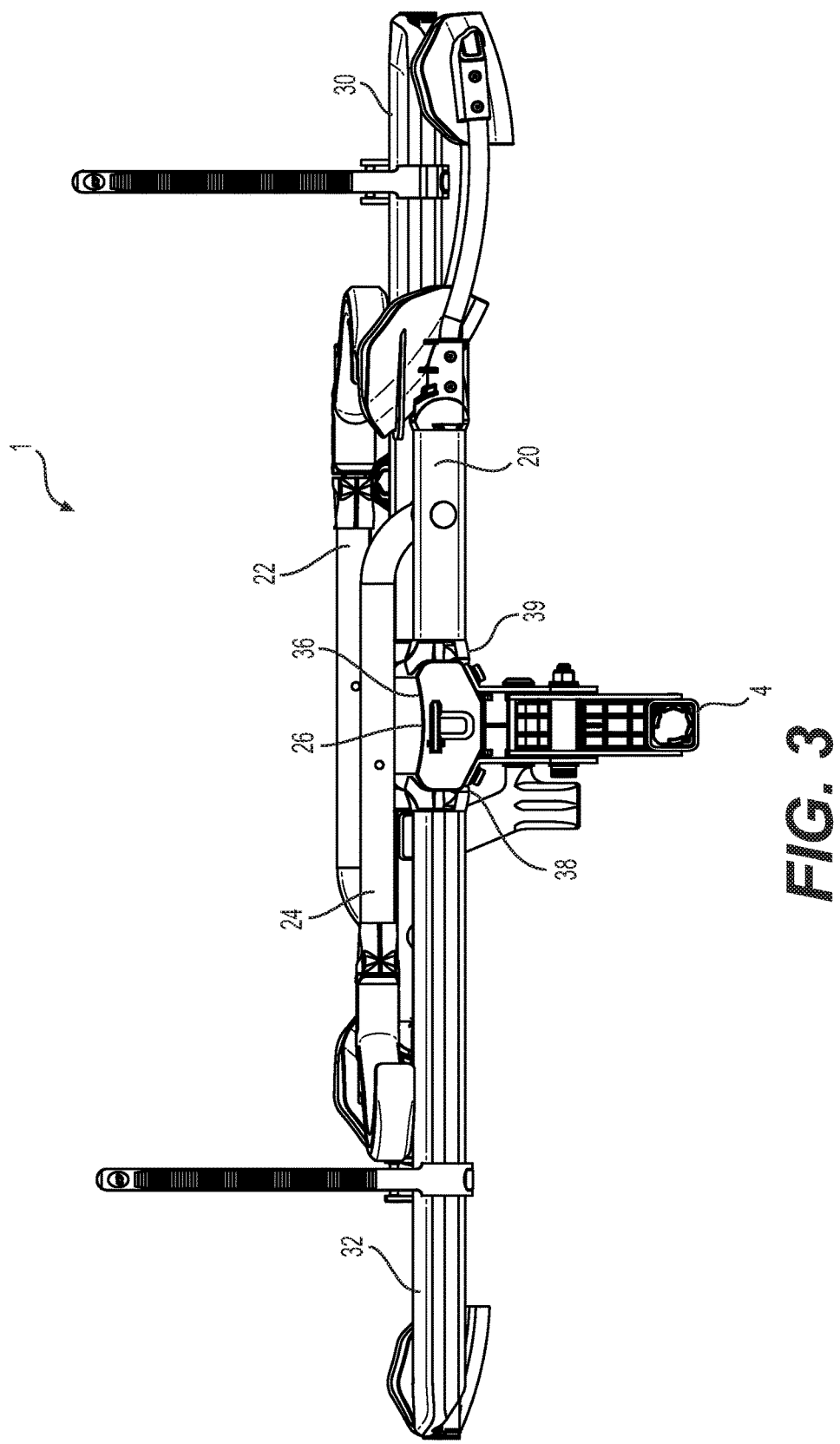
FIG. 3 is a rear view of the hitch-mounted carrier of FIG. 1.
Figure 4:
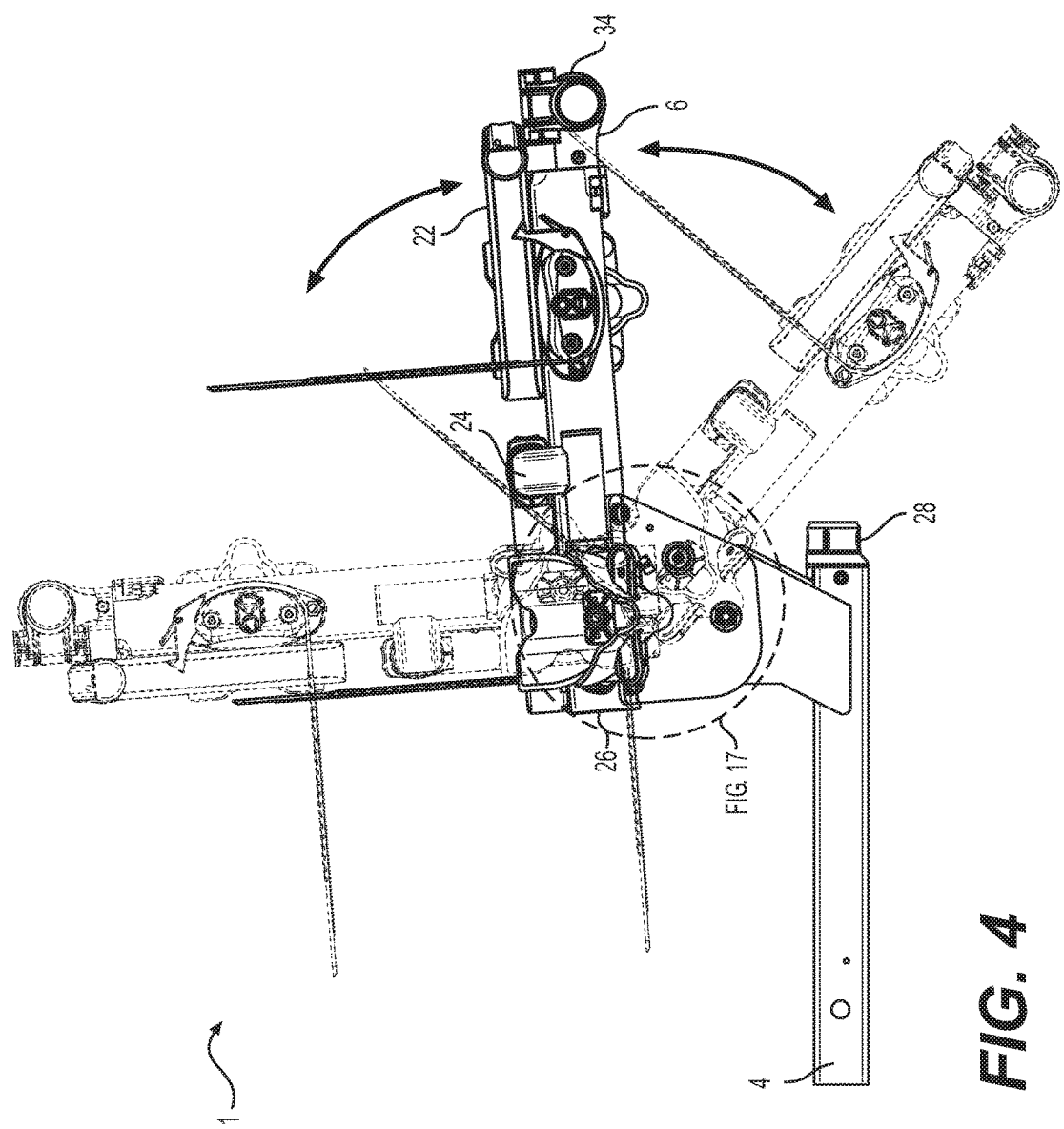
FIG. 4 is a side view of the hitch-mounted carrier of FIG. 1 with portions shown in phantom displaying the hitch-mounted carrier in three configurations.
Figure 5:
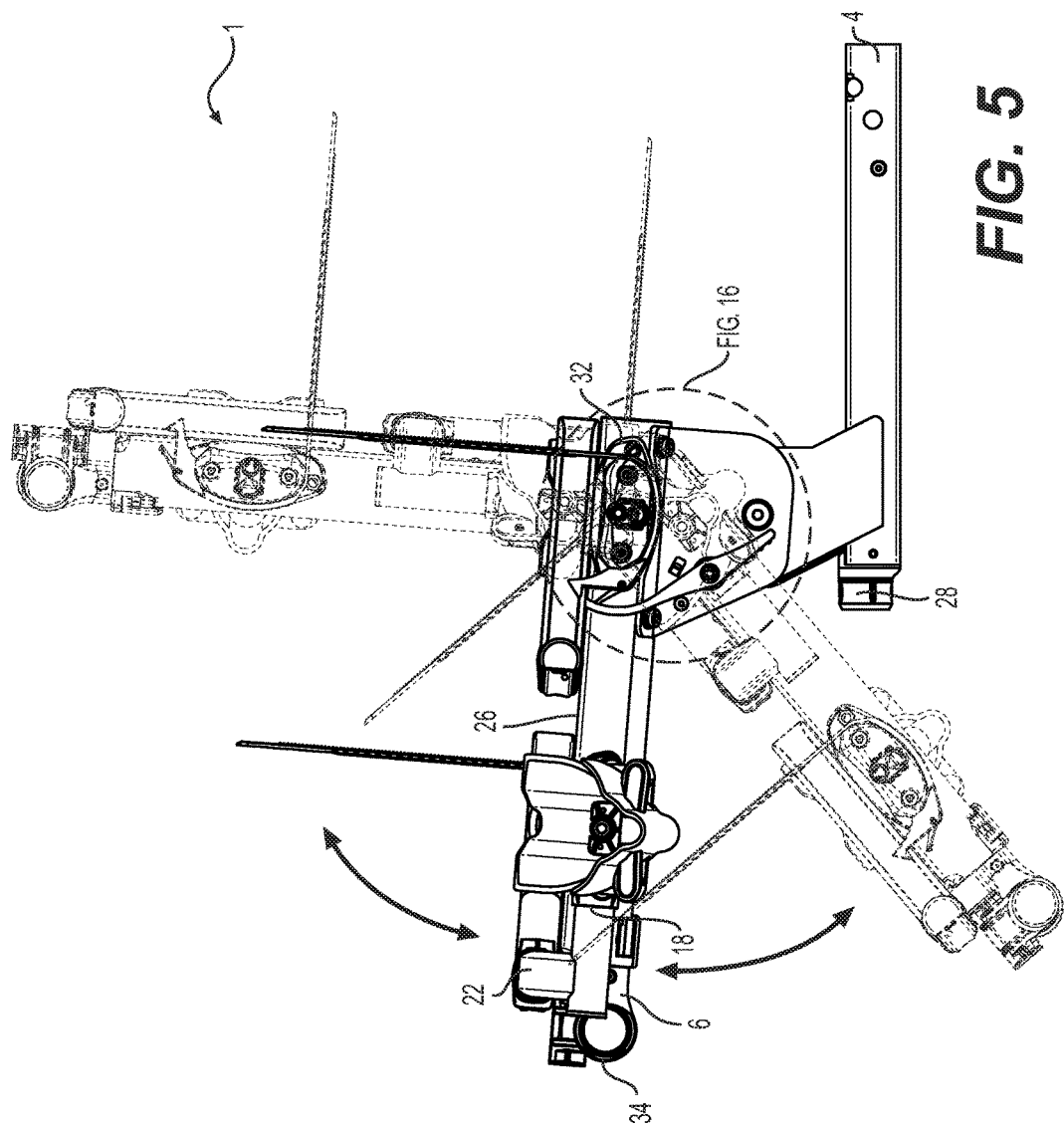
FIG. 5 is a side view of the hitch-mounted carrier of FIG. 1 with portions shown in phantom displaying the hitch-mounted carrier in three configurations.

Reference will now be made in detail to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

FIGS. 1-9 illustrate a bike carrier or hitch-mounted carrier 1 adapted to support at least one bike 12 thereon. The carrier 1 may be capable of selectively attaching to a vehicle 8 in any appropriate manner. In the illustrated example of FIG. 9, the carrier 1 is connected to a hitch receiver 2 at a first end 4 of the carrier 1, the hitch receiver 2 being attached to a rear portion 5 of a vehicle 8. The bike carrier 1 may, therefore, extend from the rear portion 5 of the vehicle 8. As a means of an example, the bike 12 may include a rear or first wheel 14 and an opposite front or second wheel 16.

The carrier 1 may include front tire tray assembly 18; hook arm assembly 22; pivot assembly 26; hitch attachment or ball cam assembly 28; rear tire tray assembly 30; and a bike docking assembly 34. The bike docking assembly 34 being located at a second end 6 of the hitch-mounted carrier 1. The front tire tray 18 corresponding with the rear tire assembly 30 are secured and attached to the pivot assembly 26 on opposed sides 38, 39 of a support member 36. In one non-limiting example, the front tire tray assembly 18 and the rear tire tray assembly may be attached to the support member 36, and in particular may be attached to either side 38, 39 of the support member 36 in any appropriate manner—including, without limitation via fasteners, screws, bolts, welding, adhering or the like. Still further, it may be monolithically formed with the support member 36. It is also foreseen that the front tire tray assembly and rear tire tray assembly may be slideably attached and/or telescoping from the support member 36.

Figure 9:
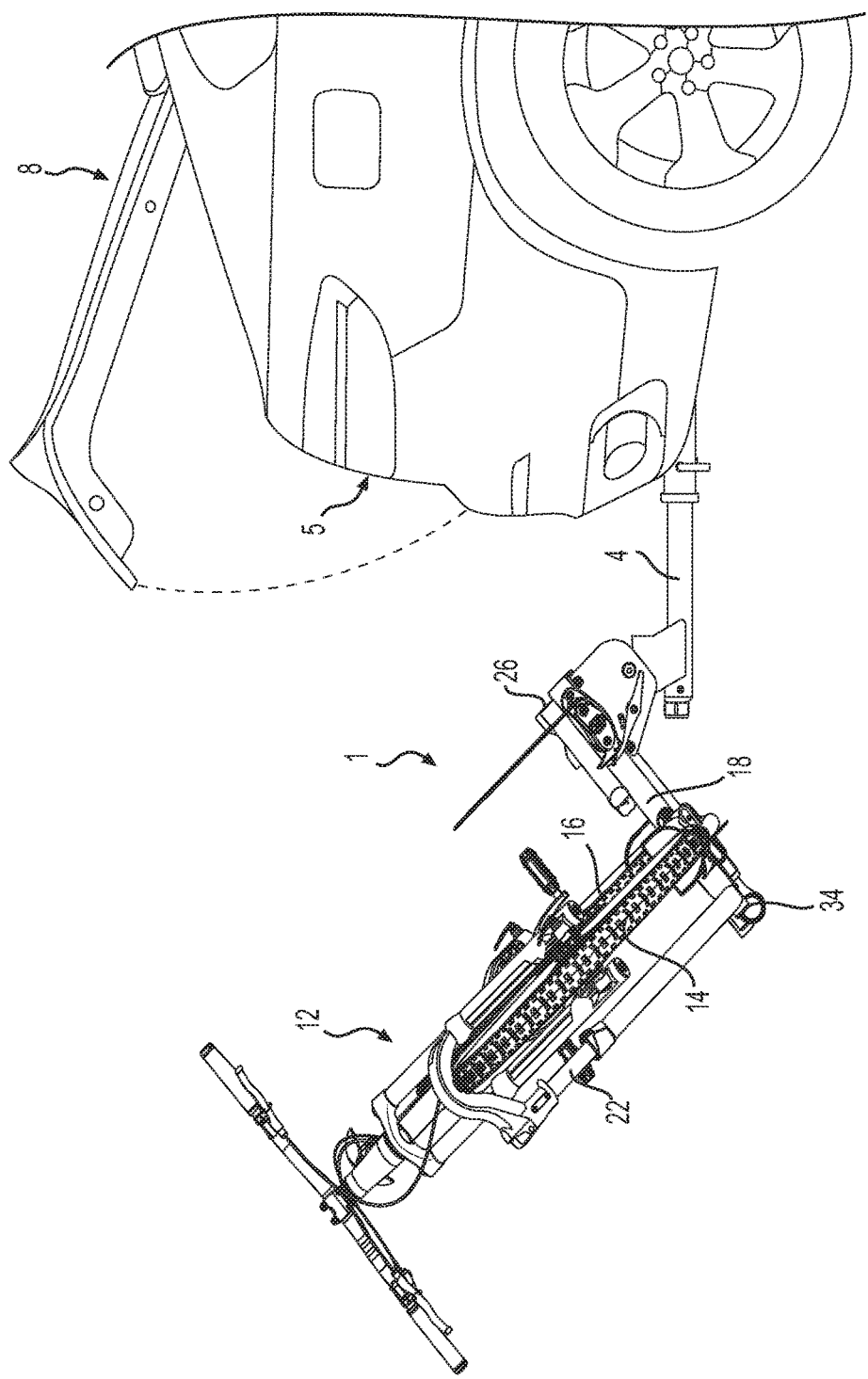
FIG. 9 is a side view of the hitch-mounted carrier of FIG. 1, a bike, and a vehicle with portions cut away, the pivot assembly being in a third position.
Figure 24:
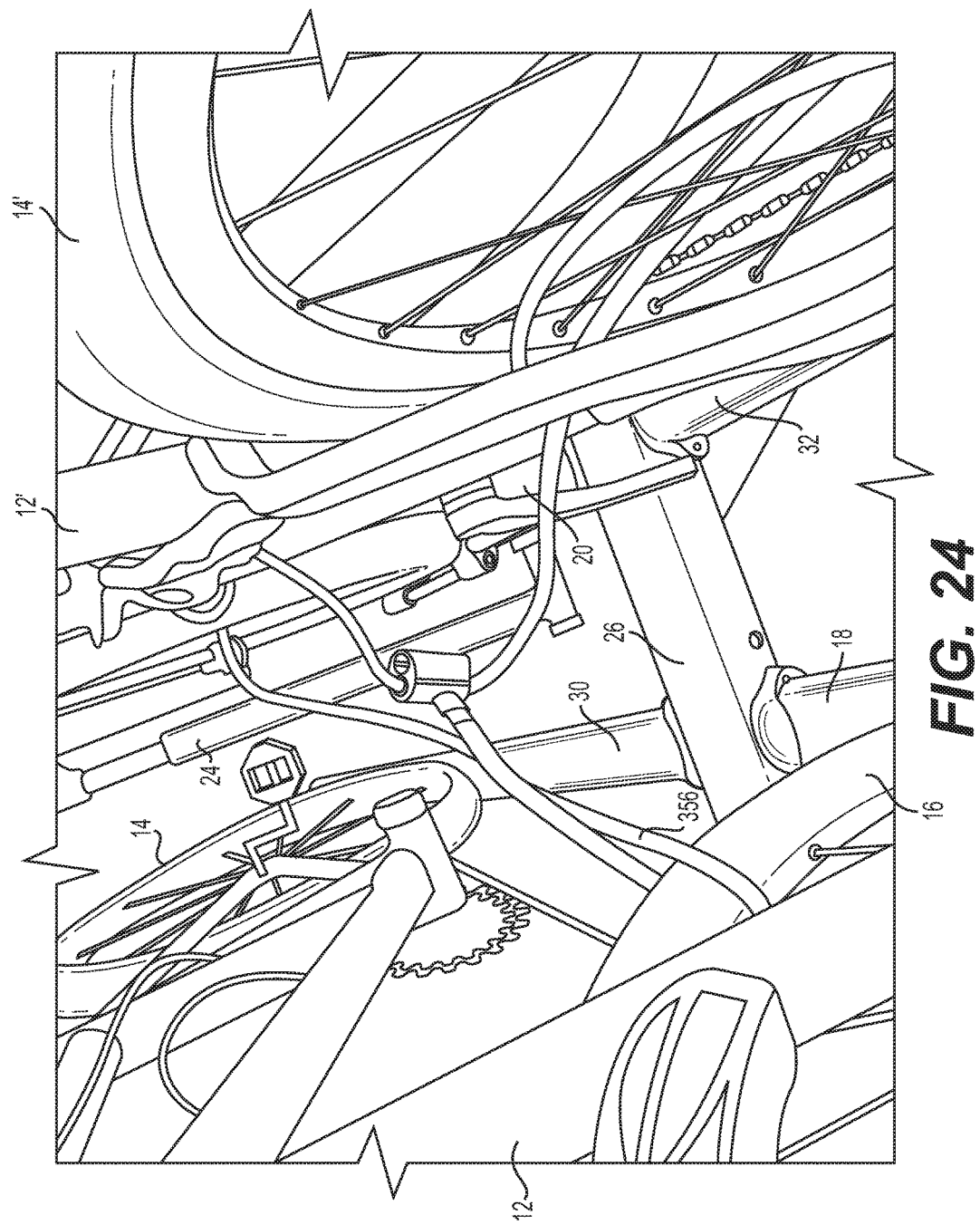
FIG. 24 is a magnified view of the lock and cable assembly in a secondary use with portions cut away.

The front tire tray 18 and rear tire tray 30 respectively configured and aligned to situate an individual bike 12 thereon (FIG. 9). The carrier 1 may further may include as illustrated front tire tray assembly 20; hook arm assembly 24; and rear tire tray assembly 32, which may be substantially similar to their counterparts front tire tray assembly 18; hook arm assembly 22; and rear tire tray assembly 30. In one embodiment, an individual bike 12 may be oriented in one direction and a second bike 12' may be oriented in the opposite direction (FIG. 24). It is understood that the orientations of the front tire trays 18, 20 and rear tire trays 30, 32 and therein the bikes 12, 12' situated thereon may be reversed or otherwise attached. It is foreseen that an adapter (not shown) could be attached to the bike carrier at the end 6 to support additional bike carrying capacity.

The bike carrier 1 including as illustrated: the front tire tray assembly 18; hook arm assembly 22; pivot assembly 26; hitch shank ball cam assembly 28; rear tire tray assembly 30; and a bike docking assembly 34 may be made of any appropriate material, such as for example steel, aluminum, a composite metal or an alloy. Alternatively, the bike carrier 1 may also be made of a combination of other moldable polymer materials such as plastics, fiberglass, carbon fiber, and the like. The bike carrier 1 may be further coated with a metallic powder.

Figure 10:
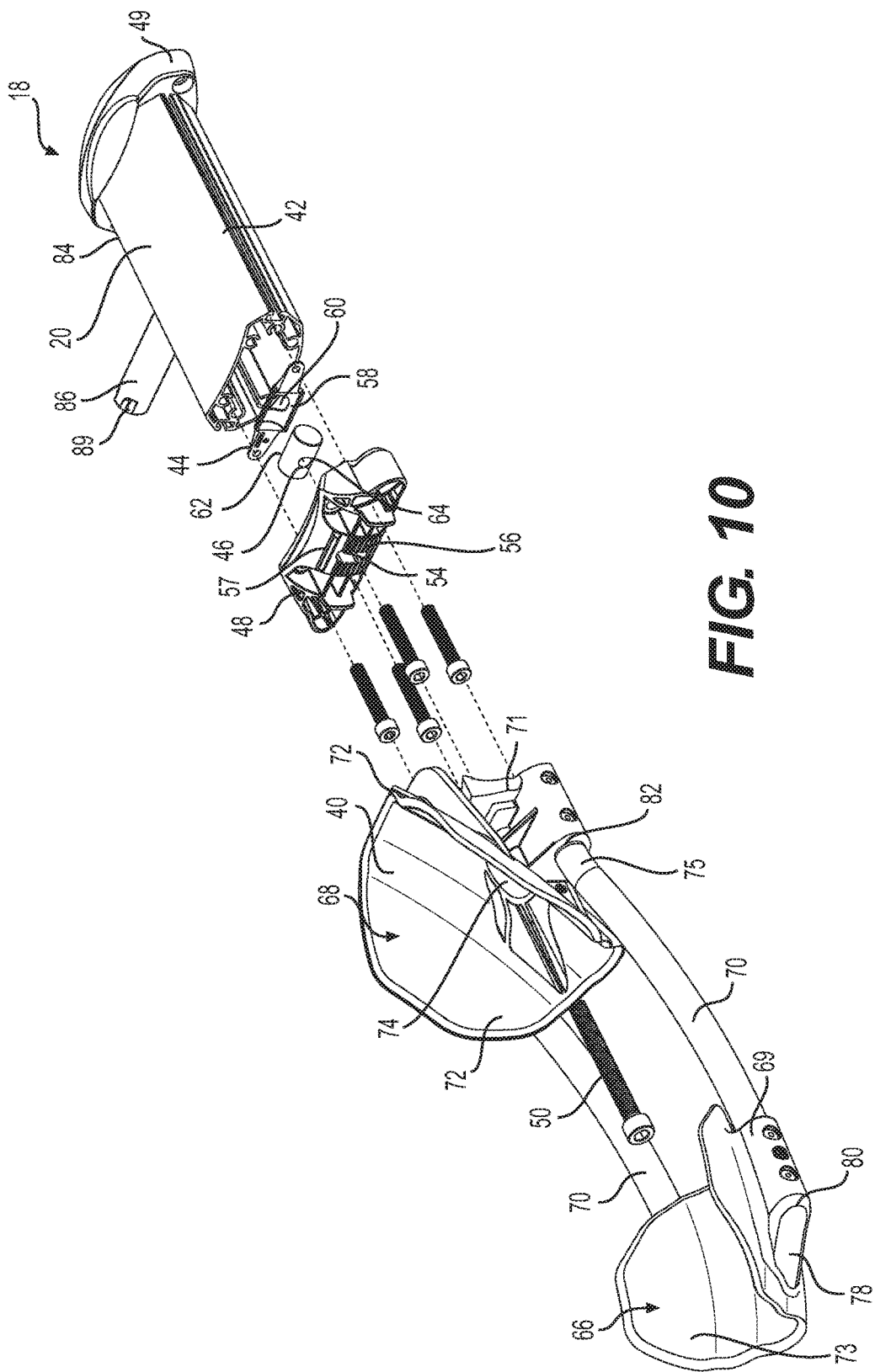
FIG. 10 is an exploded view of the front tire tray assembly of the hitch-mounted carrier of FIG. 1.
Figure 11:
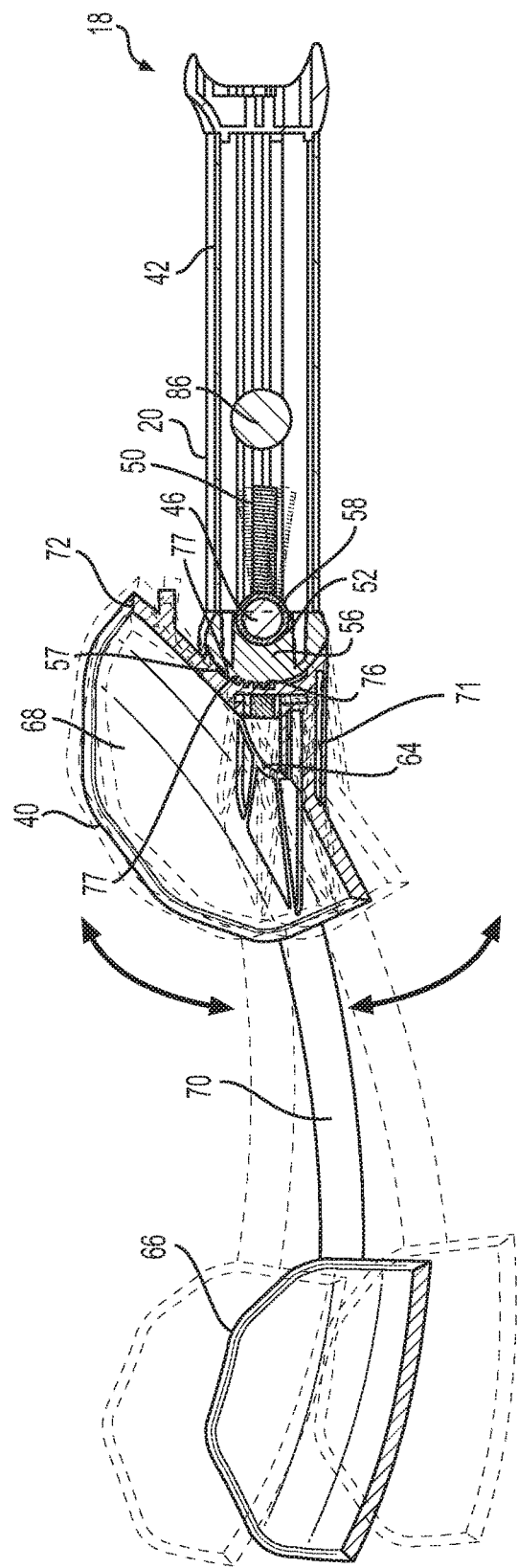
FIG. 11 is a cross section of the front tire tray assembly taken along lines 10-10 of the hitch-mounted carrier of FIG. 1 with portions shown in phantom.

Referring now to FIG. 10-11, the front tray assembly 18 may include a front tire cradle assembly 40, a cradle arm housing 42, a hold plate 44, pivot barrel nut 46, a cradle mount 48, arm connector cap 49, and a pivot holding screw 50. The arm connector cap 49 connects the front tray assembly 18 to the support member 36. The position of the front tire tray assembly 20 relative to the support member 36 may allow for a conventional wheel or tire, such as front tire 16 to be situated and balanced on the front tire cradle 40. The front tire cradle 40 may be affixed to the cradle arm housing 42 in any appropriate manner, illustrated herein by screws through the cradle mount 48. The cradle mount 48 has a curvate surface 52, the curvate surface having an elongate aperture 54. The cradle mount 48 also may include at least a portion of a gear, teeth, bumps, or ridges 56 opposite the curvate surface 52. The elongate aperture 54 passes through the ridges 56 and the curvate surface 52, for which the pivot holding screw 50 may pass through (FIG. 11). The ridges 56 terminate and a stop surface 57 may be located at the top of the ridges 56.

The hold plate 44 may be affixed to the cradle arm housing 42 in any appropriate manner, such as utilizing fasteners, being snap-fitted, friction fitted, welded, adhered or may be monolithically formed or a combination thereof. The hold plate may include a curvate surface 58, the curvate surface having an elongate aperture 60, for which the pivot holding screw 50 may pass through (FIG. 11). As such, the aperture 54 and the holding plate aperture 60 align.

The pivot barrel nut 46 may be situated in-between the hold plate 44 and the cradle mount 48, such that a circular circumferential outer surface 62 of the pivot barrel nut 46 may be positioned between the curvate surfaces 52,58 (FIG. 11) such that the surfaces engage. The pivot barrel nut 46 further may include a pass through aperture 64. The pass through aperture 64 aligns with apertures 54, 60, such that the pivot holding screw 50 may also pass through.

The front tire cradle assembly 40 may include a fore wheel support member 66, an aft wheel support member 68, and elongate connectors 70. The aft wheel support member 68 may have a body 71 and a base 72, the base 72 being secured to the body 71. The base 72 may have a generally U-shaped cross sectional configuration for receiving and supporting a portion of a wheel or tire, such as front wheel 16—although the present teachings are not limited to this specific configuration. The base 72 may be of any appropriate cross-sectional shape, including without limitation a C-shape, V-shape, etc. The base 72 is envisioned to be at an angle that is configured to mate with the circumference of a front tire 16 of the bike 12. It is foreseen in some embodiments, the aft wheel support member 68 may include a fastener (not shown). The aft wheel support member body 71 may also include an aperture 74, for which the pivot holding screw 50 may interface with. The aft wheel support member body 71 may further may include at least a portion of a gear, teeth, bumps, or ridges 76 and a stopping protrusion 77 opposite the base 72, which mate and align with the ridges 56 to create an interlocking relationship, for example, such as a ratchet and pawl (FIG. 11).

The fore wheel support member 66 may be attached to aft wheel support member 68 to create a cradle for which a front wheel 16 may be held. The fore wheel support member 66 may have a second base 73 may have a generally U-shaped cross sectional shape and may be attached to the second bracket 69. The second base 73 may be of any appropriate cross-sectional shape, including without limitation a C-shape, V-shape, etc. The second base 73 may be configured to receive a portion of the wheel of the loaded bicycle 12, such as the front wheel 16.

In the illustrated example, the fore wheel support member may be attached to elongate connectors 70 at one end 78 thereof. The first end 78 of the elongate connectors 70 pass at least partially through respective apertures 80 of the fore wheel support member 66 and by way of a non-limiting example, may be attached utilizing fasteners, being snap-fitted, friction fitted, welded, adhered or may be monolithically formed or a combination thereof to the fore wheel support member 66. Likewise, the second of the elongate connectors 70 passes at least partially through respective apertures of the aft support member 68 and may be further attached to the aft support member 68. At portion 75 of the elongate connectors 70 at the second end 79 may be orientated straight and then curves downward to the first end 78. The angle of the curve may be adapted to mimic the curvature of the front wheel 16, such that the fore wheel support member 66 engages the front wheel 16 at a further point down the circumference of the front wheel 16. It is foreseen that the elongate members 70 may be telescopic or lengthwise adjustable relative to the fore and aft support members 66, 68.

Referring now to FIG. 11, the front tire cradle assembly 40 may be rotatably adjustable or pivotable about the pivot barrel nut 46 with respect to the cradle arm housing 42. In some embodiments, the fore wheel support member 66 may include the fastener or pivot holding screw 50. The fastener 50 may be ergonomically configured to allow the user to easily toggle the fastener 50 in a tightened or loosened orientation relative to at least one of the front tire cradle assembly 40, barrel nut 46, cradle mount 48, hold plate 44, and cradle arm housing 42. When the pivot holding screw 50 is loosened, the front tire cradle assembly 40 can rotate up and down with respect to the cradle arm housing 42, as the pivot holding screw 50 is manipulated up and down and limited by the inner surface boundaries of apertures 54, 60, 64. Likewise, as the front tire cradle assembly 40 pivots upward and downward, the ridges 56 engage and interlock with ridges 76 in a gear-like fashion, such as a ratchet and pawl. The front tire cradle assembly 40 pivots downward until stop protrusion 77 of the body 71 of the aft wheel support member 68 engages the stop surface 57 of the cradle mount 48. The front tire cradle assembly pivots upward until stop protrusion 77 of the body 71 of the aft wheel support member 68 engages the ridges 56 of the cradle mount 48. Once the front tire cradle assembly 40 is positioned as desired, the fastener 50 may be tightened to lock in a position anywhere within the bounds of the apertures 54, 60, 64 and stop protrusion 77.

Figure 12:
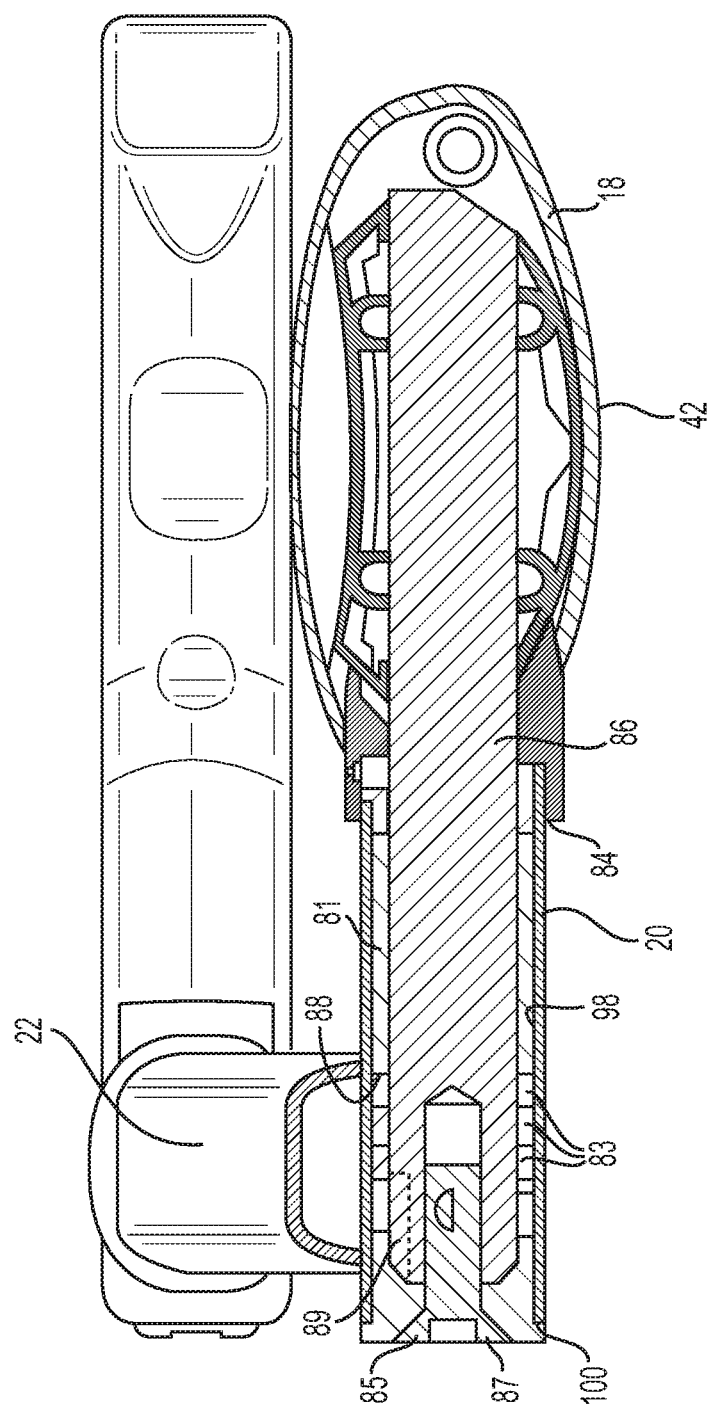
FIG. 12 is a cross section of the hook arm assembly and the front tire tray assembly taken along lines 12-12 of the hitch-mounted carrier of FIG. 1.
Figure 13:
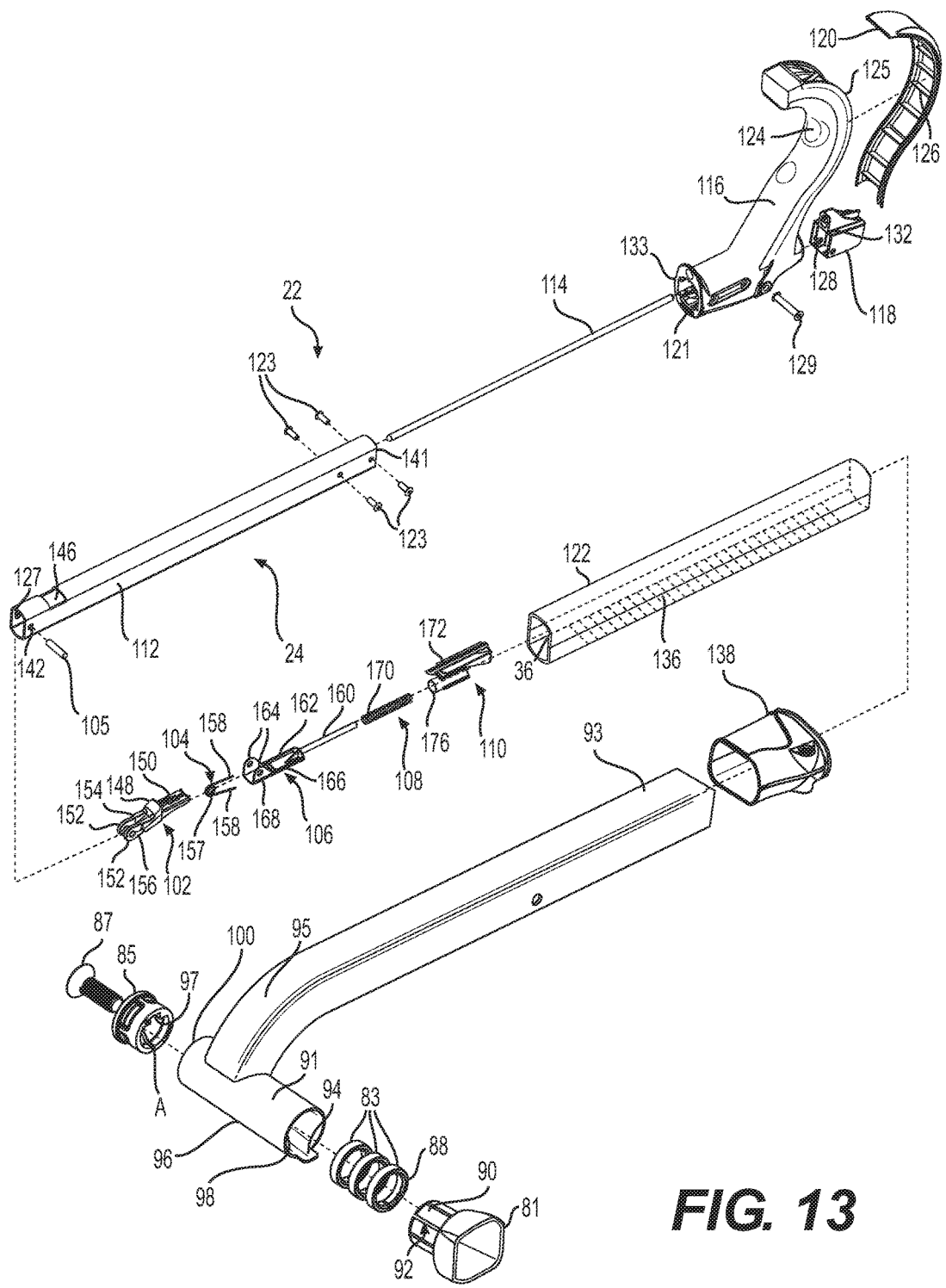
FIG. 13 is an exploded view of the tire hook arm assembly of the hitch-mounted carrier of FIG. 1.

Referring now to FIGS. 12-13, the tire hook arm assembly 22 may be attached to the front tire tray assembly 18 by means of at least one of a stop bushing 81, at least one friction clip 83, a friction sleeve 85, and a fastener 87. Along a side 84 of the cradle arm housing 42 running perpendicular to the cradle arm housing 42 may be an arm protrusion 86, so shaped to situate itself within a tubular portion 91 of a retaining arm 93 of the hook arm assembly 22. The arm protrusion 86 may have at least one shelf surface 89 located on an end thereof, so as to mate with inner surfaces 97 of the friction sleeve 85. The retaining arm may have a curved portion 95 that connects with the tubular portion 91.

The stop bushing 81 may be circularly shaped with individual pressure plates 90 at least partially separated by individual spaces 92. It is foreseen that the stop bushing 81 and the pressure plates may be two separate pieces engaging one another and constructed of two different materials. The pressure plates interact with an inner surface 98 of the tubular portion 91 to create a friction fit. It is foreseen that the stop bushing 81 may further may include a stop surface (not shown) that would interact with a protrusion 94 located on a lower end 96 of the hook arm assembly 22. It is envisioned that the stop surface would stop the rotation of the hook arm assembly 22 about the arm protrusion 86.

The at least one friction clip 83 is illustrated as being shaped like ring with an outer surface 88 and a predetermined thickness. The at least one clip 83 may be situated such that the arm protrusion 86 passes at least partially through the friction clip 83. The friction clip 83 may further aid in creating a friction fit with the inner surface 98 of the tubular portion 91.

The friction sleeve 85 may be shaped like an elongate ring or tube. The friction sleeve 85 may be situated on one end 100 of the tubular portion 91. It is foreseen that the friction sleeve may further include a gap A, which may be straight or angled. The gap A allows for expansion of the friction sleeve 85 when interacting with at least one of the fastener 87 and the protrusion 86. The protrusion may act to spread the friction sleeve 85 further open to increase the friction pressure fit of the friction sleeve 85 and the tubular portion 91. The friction sleeve 85 may further aid in creating a friction fit with the inner surface 98 of the tubular portion 91.

Figure 8:
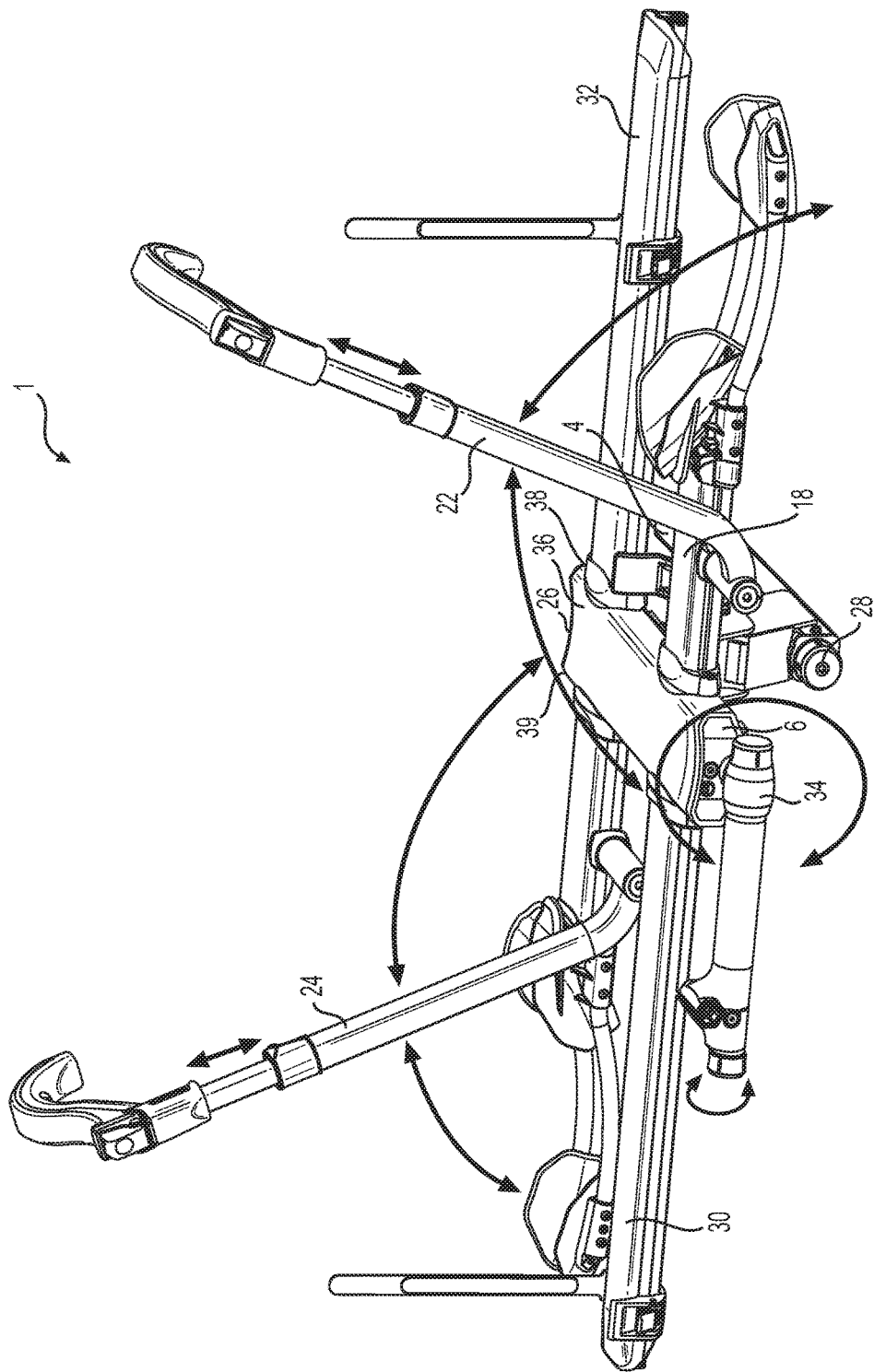
FIG. 8 is a perspective view of the hitch mounted carrier of FIG. 1 with the tire hook arms extended upwardly.

The hook arm assembly 22 may be pivotally arranged relative to the front tire assembly 18 (FIG. 8). The tubular portion 91 of the retaining arm 93 may be arranged so it rotates or pivots about the protrusion 86 of the front tire tray assembly 18. The friction fit of at least one of the components: stop bushing 81, at least one friction clip 83, a friction sleeve 85, and a fastener 87 configure the hook arm assembly 22 to remain at the relative position or angle it may be oriented to (FIG. 8). The retaining arm 93 may be pivoted and adjusted into a position to support either the frame or the wheel of the bike 12 onto the carrier 1. This adjustment of the bike carrier 1 is configured to accommodate different sizes of wheels and frames for various bikes 12. It is foreseen that the hook arm assembly may also be in a floppy configuration that does not stay in the position left without further assistance, i.e. positioning it on the front tire.

Figure 14:
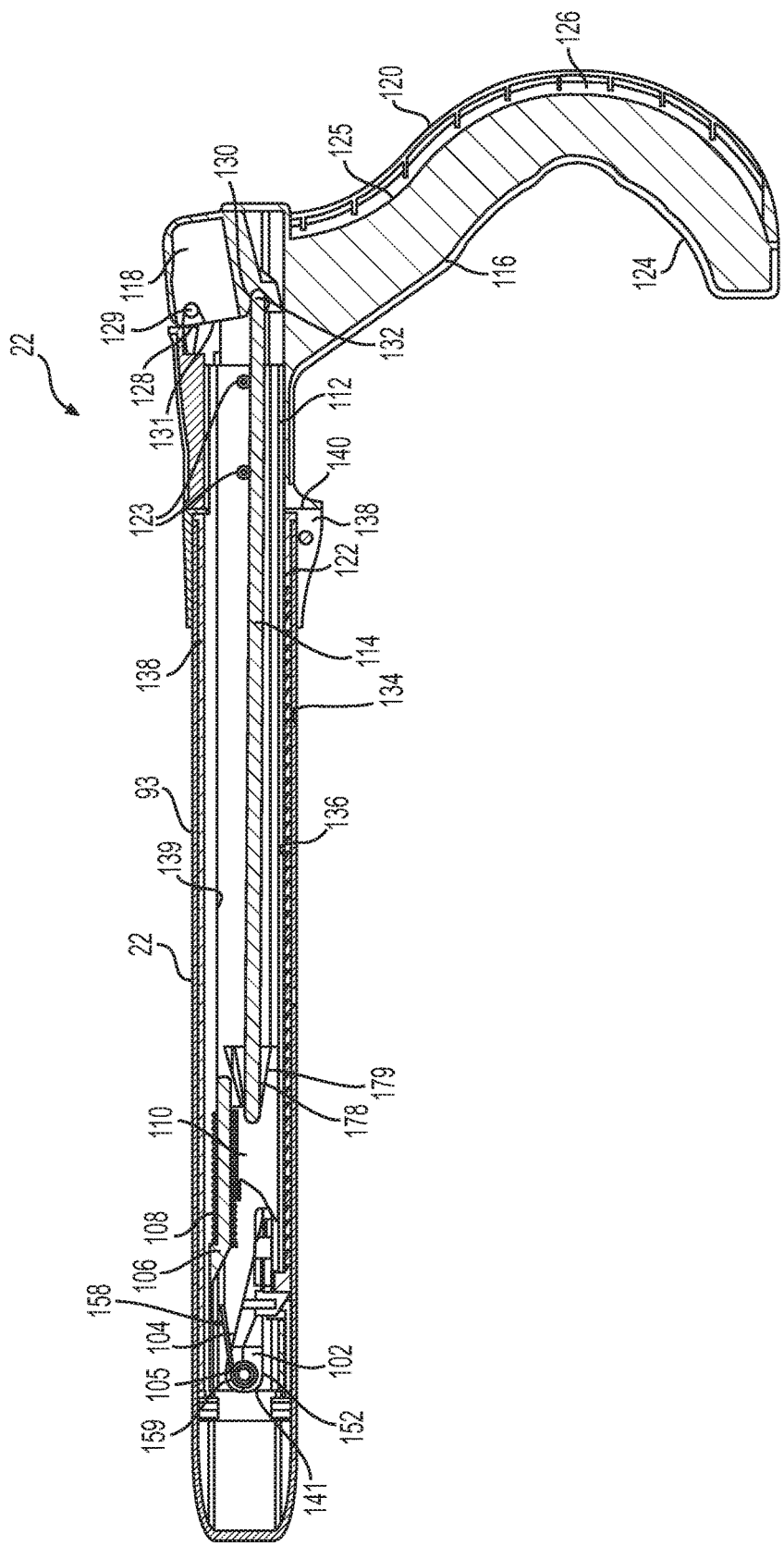
FIG. 14 is a cross section of the tire hook arm assembly taken along the lines 14-14 of the hitch-mounted carrier of FIG. 1 with portions cut away to show detail of interaction between ratchet pawl and ratchet rack sleeve.

Referring to FIGS. 13-14, the illustrated hook arm assembly 22 may include a retaining arm 93, ratchet pawl 102, a torsion spring 104, a ratchet pin 105, a push rod spring guide 106, a ratchet arm compression spring 108, a ratchet pushrod 110, an inner arm tube 112, a pushrod 114, a hook component lower portion 116, a ratchet hook button 118, a hook component upper portion 120, an upper cap 138, and a ratchet rack sleeve 122. The upper portion 120 and the lower portion 116 of the hook arm assembly may be attached utilizing by way of non-limiting examples: fasteners, being snap-fitted, friction fitted, welded (i.e. sonic welded), adhered or may be monolithically formed or a combination thereof to each other. The lower portion 116 may include a curved or hooked section 124 configured to hold at least a portion of a wheel, i.e. front wheel 16. Likewise, the upper portion 120 may include a curved or hooked section 126 that may be sized and shaped to mate atop an upper surface 125 of the lower portion 116. The lower portion 116 may include an elongate bore 121 with an exit 123 through the side of the lower portion 116 near a top thereof. The bore 121 houses the ratchet hook button 118 at exit 123 and an end 127 of the inner arm tube 112 and the pushrod at a lower exit 133.

Additionally, the hook arm assembly 22 may include the toggle member or ratchet hook button 118 that may selectively unlock and release the inner arm tube 112 into a position to elongate or lengthen, as well as contract or collapse the hook arm assembly 22. The button 118 may be substantially cubed shaped and may include rounded edges for better topographic or more ergonomic feel. In the illustrated example, the button 118 may include a first indent, cavity, or cutout 128 on a bottom side 131 that may be sized and shaped to substantially cover a pin 129 that acts as a pivot for the button 118. The button 118 also may include a second indent, cavity, or cutout 130 that may be sized and shaped to mate with an end 132 of the pushrod 114, so as to be able to manipulate the pushrod 114 in a lengthwise direction, as will be further discussed below.

The retaining arm 93 may be tubular with an inner surface 134. Housed and running parallel within the tube along and engaging the inner surface 134 may be the ratchet rack sleeve 122. The ratchet rack sleeve 122 may be attached utilizing by way of non-limiting examples: fasteners, being snap-fitted, friction fitted, welded (i.e. sonic welded), adhered or may be monolithically formed or a combination thereof to the inner surface 134. The ratchet rack sleeve 122 may include a at least a portion of a gear, teeth, bumps, or ridges 136 along an inner surface 137 of the ratchet rack sleeve 122. At the point where the retaining arm 93 meets the lower portion 116 of the hook arm assembly 22 may be a cap 138. The cap 138 may be tubular and covers the top ends of both the retaining arm 93 and the ratchet rack sleeve 122. The cap 138 creates a stop surface 140 such that the lower portion 116 abuts against the stop surface 140 of the cap 138. It is foreseen that the racket rack sleeve 122 may be two separate pieces engaging one another.

Housed and running parallel within the retaining arm 93 and engaging the ridges 136 of the ratchet rack sleeve 122 may be the inner arm tube 112. The inner arm tube 112 may be an elongate tube with an inner surface 139. Unlike the ratchet sleeve 122, the inner arm tube 112 may be slideable with respect to the retaining arm 93 and the ratchet rack sleeve 122 and passes at least partially within the bore 121 of the hook component upper portion 116. At a far end 127 of the inner arm tube 112 may be a pass through aperture 142 for which the ratchet pin 105 may situate therethrough. Along at least one side 144 of the inner arm tube 112 may be an aperture 146 configured to allow a tooth portion 148 of the ratchet pawl 102 to at least partially pass through. In the illustrated example, the aperture 146 is square shaped, but is envisioned to be any geometric shape, i.e. rectangular, circular, etc.

The ratchet pawl 102 may be an elongate component situated within the inner arm tube 112 near the end 127. The ratchet pawl 102 has a body 150, two opposed arms 152, and the tooth portion 148. The body 150 extends lengthwise into the two opposed arms 152 create a channel 154 in-between the arms 152 that runs perpendicular to the body 150. Each arm 152 has an individual aperture 156 that may be sized and shaped for the ratchet pin 105 to pass through. The ratchet pin 105 may further lock the ratchet pawl into a position. The tooth portion 148 runs perpendicular to the body 150 and passes through the aperture 146 to engage and interface with the at least a portion of a gear 136 of the ratchet rack sleeve 122, thereby creating a ratchet and pawl configuration.

Figure 15:
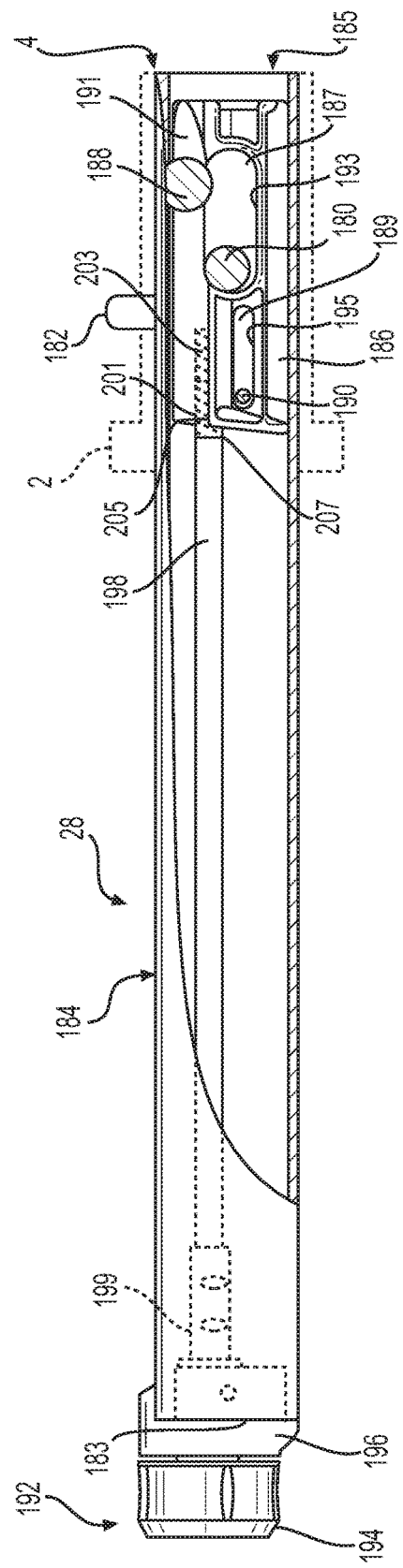
FIG. 15 is a side view of the hitch shank ball cam assembly of the hitch-mounted carrier of FIG. 1 with portions cut away and shown in phantom.

Situated within the channel 154 may be the torsion spring 104. The torsion spring 104 may be a coil 157 with two ends 158 oriented substantially straight in the direction of the lower portion 116 and an aperture 159 that may be sized and shaped for the ratchet pin 105 to pass through (FIG. 15). The torsion spring 104 operates to fix the tooth portion 148 downward and engaging the at least a portion of a gear 136 of the ratchet rack sleeve 122, unless released as will be further explained below.

The push rod spring guide 106 may be situated at or near the end 127 of the inner arm tube 112 and engages the ratchet pawl 102. The push rod spring guide 106 may include a projection 160, a body 162, and arms 164. At an end 166 of the body 162 are two arms 164 rising perpendicular to the body 162, which runs lengthwise along the inner arm tube 112. The arms 164 each have an aperture 168 that may be sized and shaped for the ratchet pin 105 to pass through. The apertures 156, 159, 168 are each aligned with one another such that the ratchet pin 105 holds the respective ratchet pawl 102, torsion spring 104, and the push rod spring guide 106 in place. The projection 160 is illustrated as an elongate cylinder. The projection 160 passes at least partially through a bore 176 of the ratchet arm compression spring 108. The ratchet arm compression spring 108 may be an elongate coil that runs lengthwise within the inner arm 116 and circulates about the bore 170.

The ratchet pushrod 110 may include a body 172 having a rod hole 179 and a spring hole 176. The rod hole may have a conical inner surface 178 and the body 172 may be at least partially likewise shaped to provide such an inner surface 178. The rod hole 179 being sized and shaped to capture the pushrod 114 within. The spring hole 176 may be tubular shaped and sized to capture and align the compression spring 108 situated on the projection 160. The body 172 may be cylindrically shaped so as to provide a tubular shape for the spring hole 176.

The front tire tray assembly 18 and the hook arm assembly 22 are configured to support the loaded bicycle 12 in an upright position, such that a portion of a wheel, i.e. front tire 16 may be supported by the front tire tray assembly 18 and another portion of the wheel may be capture by the hook arm assembly 22. The hook arm assembly 22 extends and/or retracts the inner arm tube 112, such that the overall length of the hook arm assembly 22 may be adjusted (FIG. 8). It is foreseen that a tire adaptor (not shown) may be added to the hook arm assembly 22 to better wrap about smaller tires radius tires, as well as, smaller tire width.

The hook arm assembly 22 may be extended and/or retracted by manipulating the button 118, which pushes the pushrod 114 downwardly, which in turn manipulates the ratchet pushrod 110 downwardly, wherein the body 172 compresses the compression spring 108 to manipulate the ratchet pawl 102 upwardly thereby removing the tooth portion 148 from being captured by the at least partial gear 136 of the ratchet rack sleeve 122. The pushrod 114 may be aligned or substantially captured with fasteners 123. Once released the compression spring 108 expands pushing the inner arm tube 112 in the opposite direction, i.e. upwardly, thereby extending the overall length of the hook arm assembly 22. The torsion spring 104 manipulates the tooth portion 148 of the ratchet pawl 102 to be captured again by the at least partial gear 136 of the ratchet rack sleeve 122, therein locking the hook arm assembly 22 at a particular length. The length manipulation may be altered by how many ridges 136 at situated on the ratchet rack sleeve 122. It is foreseen that depending on the shape of the ridges 136 that locking may only be in one direction, wherein manipulation of the button 118 may not be required to respectively extend or retract depending upon the direction of the gear teeth.

Referring now to FIG. 15, the hitch attachment or ball cam assembly 28 may be a capable of attaching to the hitch receiver 2 at the rear portion 5 of the vehicle 8 (FIG. 9). The hitch attachment assembly 28 may be configured to be attached to any sized vehicle hitch 2, such as class I, II, III, or IV. A hitch pin 180 may pass through apertures (not shown) in the hitch receiver 2 and may further include a locking apparatus 182 to deter theft and vandalism by restricting the hitch pin 180 from being removed.

The hitch attachment assembly 28 may include hitch shank 184, cam block 186, ball 188, bolt 190, and knob assembly 192. The hitch shank 184 may be tubular in shape oriented in the longitudinal direction L and having a first end 183 and a second end 185.

The knob assembly 192 may include a knob 194, knob housing 196, and a shaft or rod 198. The knob housing 196 may be situated on the first end 183 adjacent the knob 194. The knob housing 196 may be attached utilizing fasteners, being snap-fitted, friction fitted, welded or adhered to the hitch shank 184 or may be monolithically formed with the hitch shank 184 or a combination thereof. The shaft 198 may be situated in a center of the knob 194 and knob housing 196.

The cam block 186 may be situated within the hitch shank 184 at or near the second end 185 such that at least a portion of the cam block 186 may be covered by the hitch shank 184. The cam block 186 may be substantially cylindrically shaped with a pin aperture 187, a bolt aperture 189, and a ball groove 191. The pin aperture 187 may be elongate in the longitudinal direction L and may be sized and shaped such that the hitch pin 180 may be slideable about an inner surface 193 of the pin aperture 187. Likewise, the bolt aperture 189 may be elongate in the longitudinal direction L and may be sized and shaped such that a bolt 190 may be slideable about an inner surface 195 of the pin aperture 187. The ball groove 191 may be a cut-out end to end longitudinally and situated about the top half of the cam block 186. The ball groove 191 may be sized and shaped such that the ball 188 may rest within the groove 191. As the ball groove 191 approaches the second end 185 of the hitch shank 184, it may ramp upwardly. It is foreseen that the ball groove 191 may taper or cam as the groove 191 approaches the second end 185. The ball 188 may be situated within a ball aperture 197 of the hitch shank 184 (FIG. 16), such that the ball 188 may be captured by the hitch shank 184 and the ball groove 191. It is foreseen that the ball 188 may rotate once loaded within the hitch receiver 2.

The shaft 198 may be elongate in the longitudinal direction L and is illustrated as cylindrically shaped. The shaft 198 has a first end 199 which may be secured to the knob 194 and a second end 201, which may be secured by threads 207 located within a threaded aperture 203 located on one end 205 of the cam block 184 covering at least a portion of the threads 207 thereof. The knob 194 may be rotatable and affixed to the shaft 198, such that the shaft 198 rotates with the knob 194.

It is envisioned that once the bike carrier 1 may be loaded within the hitch receiver 2, and in order to tighten (or dampen wobbling) and loosen the hitch mounted carrier 1, the knob 194 may be rotated. Rotation of the knob 194 causes the rod or shaft 198 to rotate, and rotation of the rod 198 causes the cam block 186 to move (i.e., towards or away from the knob 194, depending on the direction that the knob 194 is rotated) due to the interaction between the rod threads 203 and the threaded aperture 203. The knob 194 rotates the shaft 198 about the threaded aperture 203 to displace the cam block 186 longitudinally. In one direction the bolt 190 and bolt aperture 189 and pin 180 and pin aperture 187 may stop, limit, or restrict the longitudinal movement and in the opposed direction the camming effect of the ball groove 191 interacting with the ball 188 may stop, restrict or limit movement of the cam block 186 in the longitudinal movement.

It is foreseen that any kind of hitching system, mechanism or other means of attachment to a vehicle 8 may be used without departing from the present teachings. Moreover, it should be appreciated that the features, components, elements and functionalities of the other embodiments may be combined or altered to achieve the bike carrier 1 without departing from the spirit and scope of the present teachings.

Figure 16:
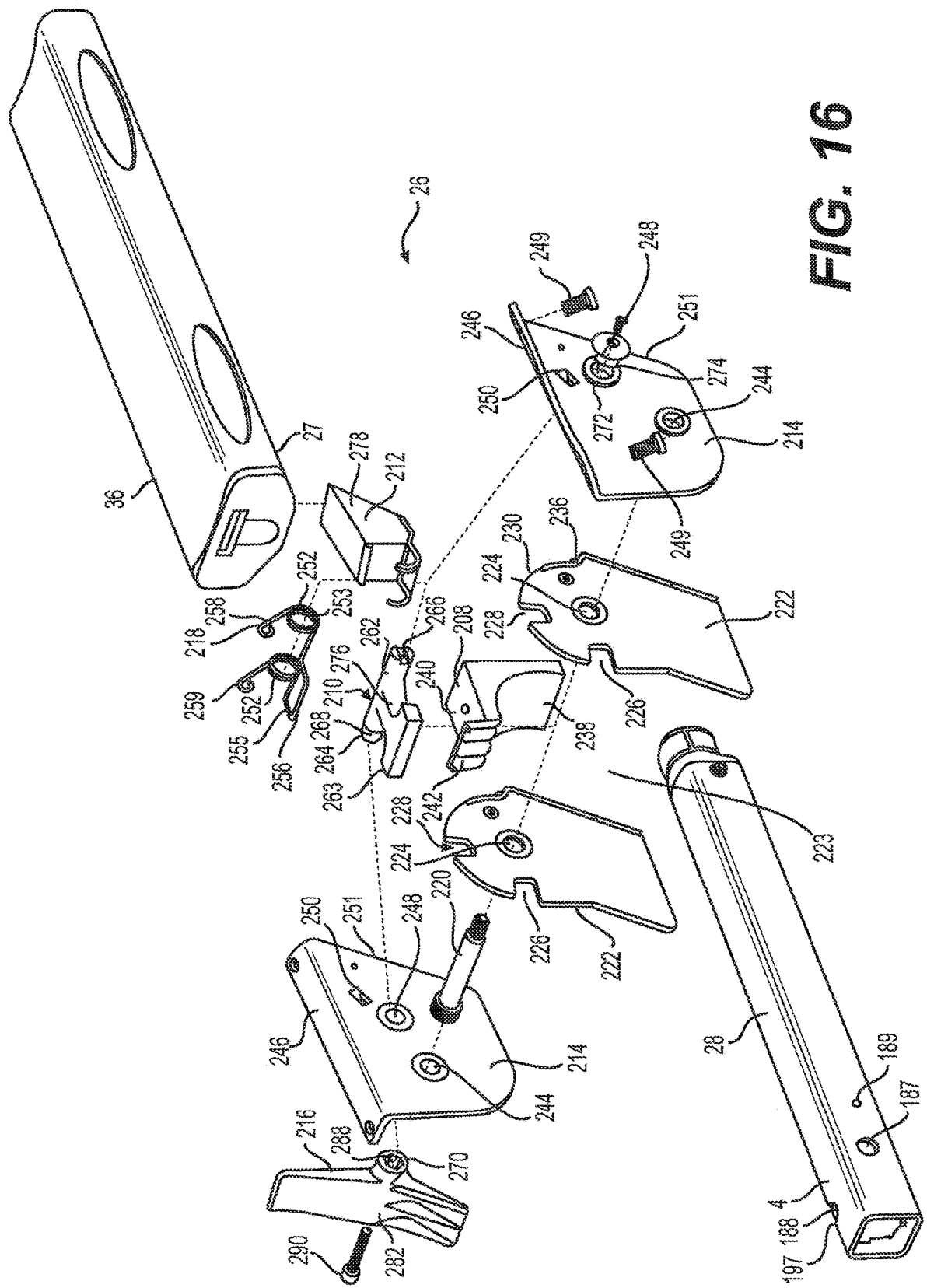
FIG. 16 is an exploded view of the pivot assembly and hitch attachment assembly of the hitch-mounted carrier of FIG. 1.
Figure 17:
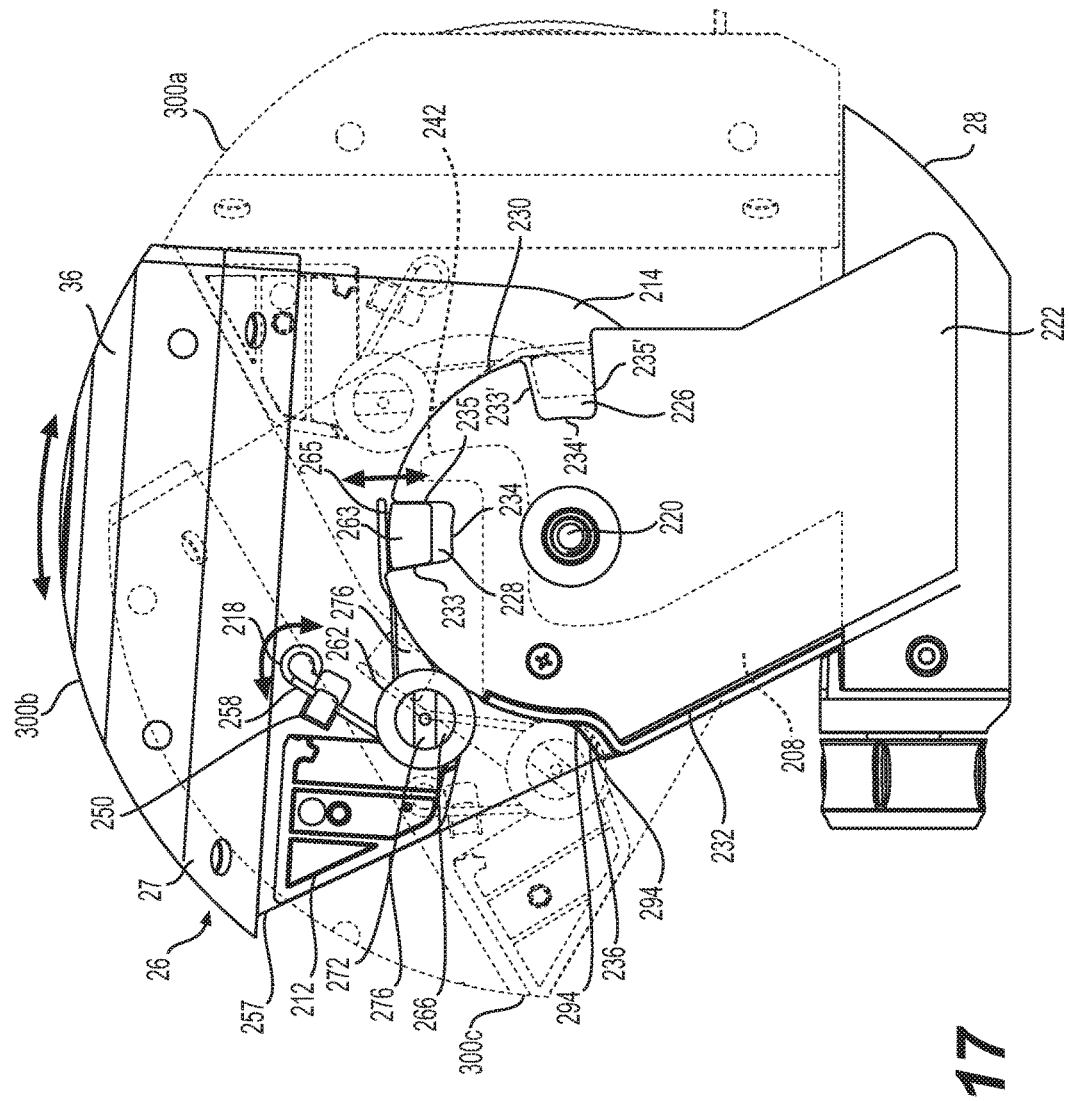
FIG. 17 is a magnified perspective view of the pivot assembly of FIG. 4 with portions shown in phantom and portions cut-away to show further detail.
Figure 18:
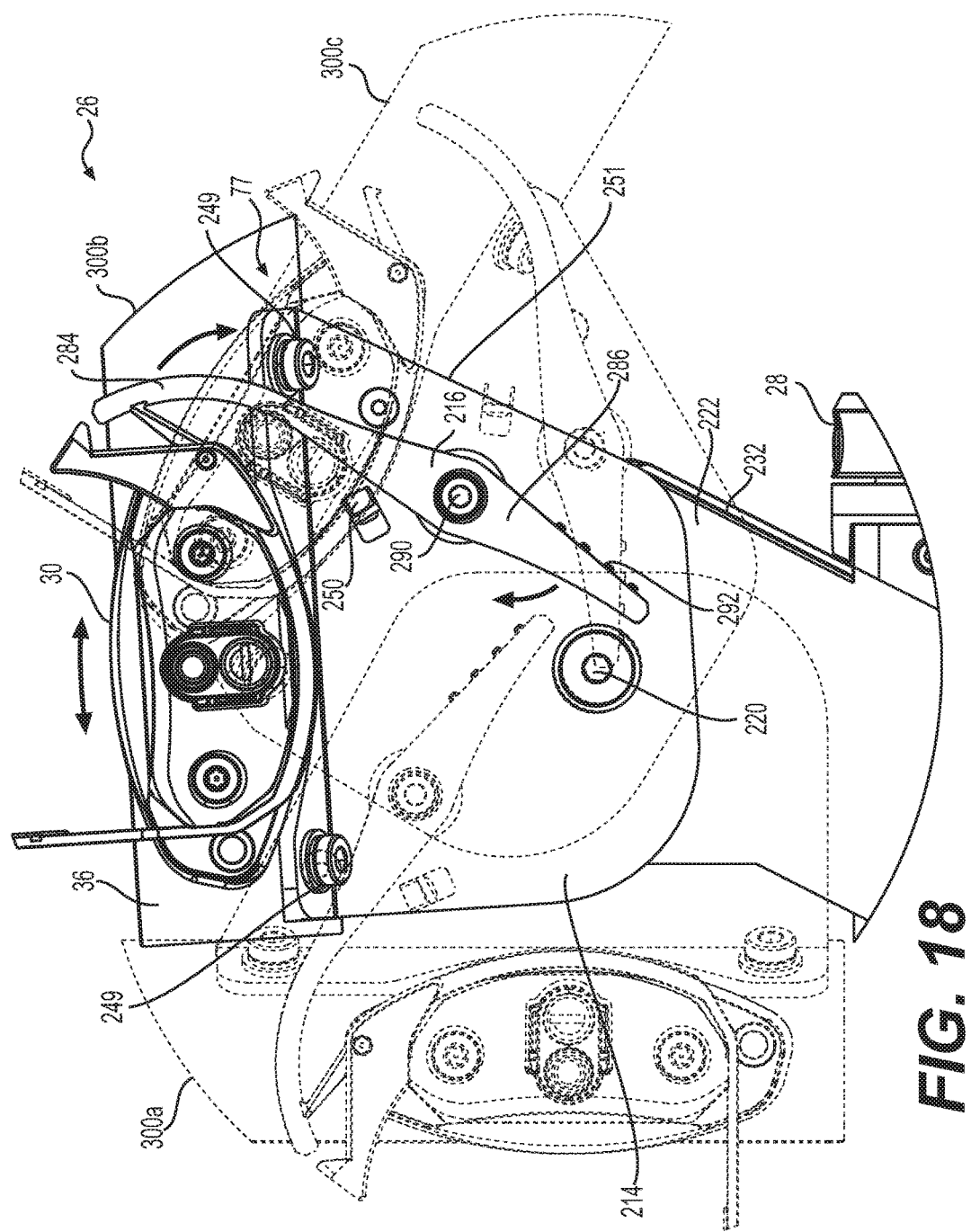
FIG. 18 is a magnified perspective view of the pivot assembly of FIG. 5 with portions shown in phantom.

Referring now to FIGS. 16-18, the pivoting assembly 26 may include a ribbed back cap 208, a latch bar 210, a pivot spring cover 212, mounting plates 214, foot pedal 216, dual torsion spring 218, support member 36, pivot pin 220, and plates 222. Each plate 222 may be a substantially solid upright sheet being traverse to the longitudinal direction L. The plates 222 may be attached utilizing by way of non-limiting examples: fasteners, being snap-fitted, friction fitted, welded, sonic welded, adhered or may be monolithically formed or a combination thereof to the hitch attachment assembly 28. The plates 222 run perpendicular to the hitch attachment assembly 28 on opposed sides or opposite one another and spaced apart by the dimension of the hitch attachment assembly 28, the separation creating a channel 223 between the two plates 222. Each plate 222 has a pass through aperture 224 for which the pivot pin 220 may pass through. To deter theft and vandalism, the pivot pin 220 may be a security bolt (e.g., a rivet, a bolt requiring an uncommon wrench for removal, etc.). Each plate 222 may have a rounded top surface 230 and a sloped back surface 232. On the top surface 230, each plate 222 may have a first notch 226 and a second notch 228 grooved upon. Each notch 226, 228 may be defined by and illustrated with at least three sides 233, 234, 235, 233', 234', 235' (FIG. 17).

The ribbed cap 208 may be situated within the channel 223 between the two plates 222 (FIG. 16). The ribbed cap 208 may be attached utilizing by way of non-limiting examples: fasteners, being snap-fitted, friction fitted, welded, sonic welded, adhered or may be monolithically formed or a combination thereof to each of the plates 222 respectively. The ribbed cap 208 may be sized and shaped to substantially cover the back surfaces 232 of the plates 222 and at least a portion 236 of the top surfaces 230 of the plates 222. The ribbed cap 208 includes a body 238 and a protrusion 240 that projects longitudinally from the body 238. The protrusion 240 may further include a lip 242 that runs substantially perpendicular to the protrusion 240. In the illustrated example, at least the protrusion 240 and lip 242 are ribbed. The protrusion 240 may be situated just above the pivot pin 220 (FIG. 17).

Each mounting plate 214 may be a substantially solid upright sheet. By way of a non-limiting example, the mounting plates 214 may be attached to the support member 36, and in particular may be attached to an underside 27 of the support member 36 and to the plates 222 in any appropriate manner—including, without limitation of non-limiting examples: fasteners, being snap-fitted, friction fitted, welded, sonic welded, adhered or may be monolithically formed or a combination thereof. Each mounting plate 214 run substantially perpendicular to the hitch attachment assembly 28 and are attached to opposite sides 38, 39 of the support member and are opposed to and spaced apart from to one another. Each mounting plate 214 may have a pass through pin aperture 244 for which the pivot pin 220 may pass through or substantially pass through. Each mounting plate 214 may further include a portion 246 that may be folded about a predetermined angle, such that the support member 36 may be better situated in-between the mounting plates 214. Each mounting plate 214 may be shaped to generally conformed to at least a portion 27 of a circumference of the support member 36 and be attached with fasteners 249. Each mounting plate 214 may further include a second aperture 248 for which a portion of the latch bar 210 may pass through, substantially pass through, or be further attached thereto. Each mounting plate 214 may further include a hook 250 for which the dual torsion spring 218 may be situated thereon. The mounting plate 214 may further include a sloped back surface 251 which may align with the sloped back surface 232 of the plates 222.

The dual torsion spring 218 may include two individual coils 252, each with a pass through bore 253, each coil 252 connected to one another at ends 254, 255 by a lateral portion 256. The dual torsion spring 218 may be captured by the hooks 250 of the mounting plate 214 at opposed ends 258, 259. It is foreseen that the dual torsion spring 208 may be an individual or single spring (not shown).

The latch bar 210 may include a body 262 and a bar 263. The body 262 of the latch bar 210 may be cylindrically shaped with a first end 264 and a second end 266. The first end 264 may connect with the foot pedal 216. The first end 264 may connect by means of a hexagonal interface 268 that may mate with a hexagonal aperture 270 of the foot pedal 216. It is foreseen that the hexagonal interface may be any geometrical shape or orientated in such a way such that the foot pedal 216 may only be installed in one orientation. The second end 266 may further include a groove 272 which may mate with an elongate projection 274 so as to align the latch bar 210 with at least one of the mounting plates 214. The bar 263 is illustrated as rectangular shaped and connected to the body 262 of the latch bar 210 by a projection portion 276. It is foreseen that the bar 263 may be other geometrical shapes, i.e. circular. In the illustrated example, the latch bar 210 is overall I-shaped, but may be otherwise shaped, i.e. T-shaped, L-shaped, etc. The lateral portion 256 of the dual torsion spring 218 may be situated on a top surface 265 of the bar 263 of the latch bar 210, thereby pressing at least the bar 263 of the latch bar 210 downward (FIG. 17). The ends 264, 266 of the body 262 of the latch bar 210 pass through the torsion spring bores 253.

The pivot spring cover 212 may be situated in-between the mounting plates 214. The pivot spring cover 212 may be attached utilizing by way of non-limiting examples: fasteners, being snap-fitted, friction fitted, welded, sonic welded, adhered or may be monolithically formed or a combination thereof to each of the mounting plates 214 respectively. The pivot spring cover 212 may include a sloped back surface 276 that may align with the sloped back surface 251 of the mounting plates 214. The pivot spring cover 212 includes a body 278, wherein at least one portion 280 of the body 278 curves upwardly creating a seating surface 282, in which, the body 262 of the latch bar 210 may rest therein.

The foot pedal 216 may include a body 282, the body 282 having an upper portion 284, a lower portion 286 and a bore 288. A fastener 290 may utilize the bore 288 to attach the foot pedal 216 to the latch bar 210. It should be understood to one skilled in the art that the foot pedal 216 may be attached by other means. The bore 288 may further include the hexagonal opening 270. The upper portion 284 may be curved so as to not interact or engage either the front tire tray assembly 18 or the rear tire tray assembly 30 (as illustrated in FIG. 18). The lower portion 286 of the foot pedal 216 may include ridges 292 to further aid in creating a friction hold with a user's foot to assist in manipulating the foot pedal 216. The foot pedal 216 may be rotatable about the bore 288 as will be further described in detail below.

By way of a non-limiting example, the pivoting assembly 26 may include the pivot pin 220, the pivot pin 220 may create a pivot for the hitch attachment assembly 28 and the support member 36. The pivot pin 220, latch bar 210, and foot pedal 216 combination of the pivoting assembly 26 may allow the support member 36 to rotate relative to the hitch attachment assembly 28 about a pivot point (e.g. pin aperture 224). This motion is illustrated by FIGS. 4, 5, 17, and 18. The pivoting assembly 26 may permit the bike carrier 1 to be selectively positioned between a first position or storage configuration 300a, a second position or use configuration 300b, or a third position or trunk assess configuration 300c.

When at the storage configuration 300a, the support member 25 is generally perpendicular to the hitch attachment assembly 28 (e.g., offset between about seventy degrees to about one hundred and ten degrees). In some embodiments, the support member 36 may be offset approximately ninety degrees from the hitch attachment assembly 28 when at the first configuration 300a. In the first position 300a (shown in phantom in FIG. 17) the bar 263 of the latch bar 210 is positioned within the first notch 226 and substantially captured therein so as to restrict, limit, or restrain further movement. The body 262 of the latch bar 210 may rest on the top surface 230 of the plate 222. The bar 263 engages at least two of the second notch surfaces 233', 234', 235'.

When at the use configuration 300b, the support member 36 and the hitch attachment assembly 28 are generally parallel (e.g., offset by no more than about five degrees). In the second position 300b, the bar 263 of the latch bar 210 may be positioned within the second notch 228 and substantially captured therein so as to restrict, limit, or restrain further movement. The body 262 of the latch bar 210 may rest on the top surface 230 of the plate 222. The bar 263 engages at least two of the second notch surfaces 233, 234, 235.

The pivoting assembly 26 may permit the bike carrier 1 to be selectively rotated or pivoted to the third configuration 300c, wherein the support member 36 may be offset to an acute angle (i.e. ten to fifty degrees) from the second position, an example of the bike carrier 1 in the third position 300c is shown in FIG. 9. In the third position 300c, the bar 263 of the latch bar 210 may be positioned to engage the top surface 230 of the plate 222. The body 262 of the latch bar 210 may rest on the portion 236 of the plate 222 that may be covered by the ribbed cap 208. It is foreseen that this portion 236 creates a seat 294, wherein the body 262 of the latch bar 210 is substantially captured so as to restrain, restrict, or limit further movement of the support member 36 (shown in phantom in FIG. 17).

To transition from one position to the next (i.e. first to second, first to third), the bar 263 of the latch bar 210 must be freed from capture of either notches 226, 228 or the latch body 262 must be freed from the seat 294. For example, when in the first position 300a, the bar 263 of the latch bar 210 may be captured within the first notch 226. The foot pedal 216 may be rotated or depressed (i.e. through manipulation or depressing of the lower portion 286), which rotates the dual torsion spring 218 until it is stopped by at least one the hook 250 or the lower surface 27 of the support member 36, and rotates the latch bar body 262, which in turn lifts the bar 263 from the first notch 226, allowing the bar 263 and body 262 to slide along the top surface 230 of the plate 222 until either the bar 263 it is captured again within the second notch 228 or the body 263 of the latch bar 210 is captured within the seat 294. Once the foot pedal 216 is released the dual torsion spring 218 again puts downward pressure on the top surface 265 of the bar 263. If moving from the first position 300a to the third position 300c, one would have to maintain the depression of the foot pedal and manipulate the support member 36 further to allow the skipping of the second position 300b. In the second position 300b, the foot pedal 216 could release the bar 263 to either return to the first notch 226 and therein the first position 300a or release the bar 263 of the latch bar 210, such that the body 262 of the latch bar 210 is captured within the seat 294 as in, in the third position 300c.

Figure 19:
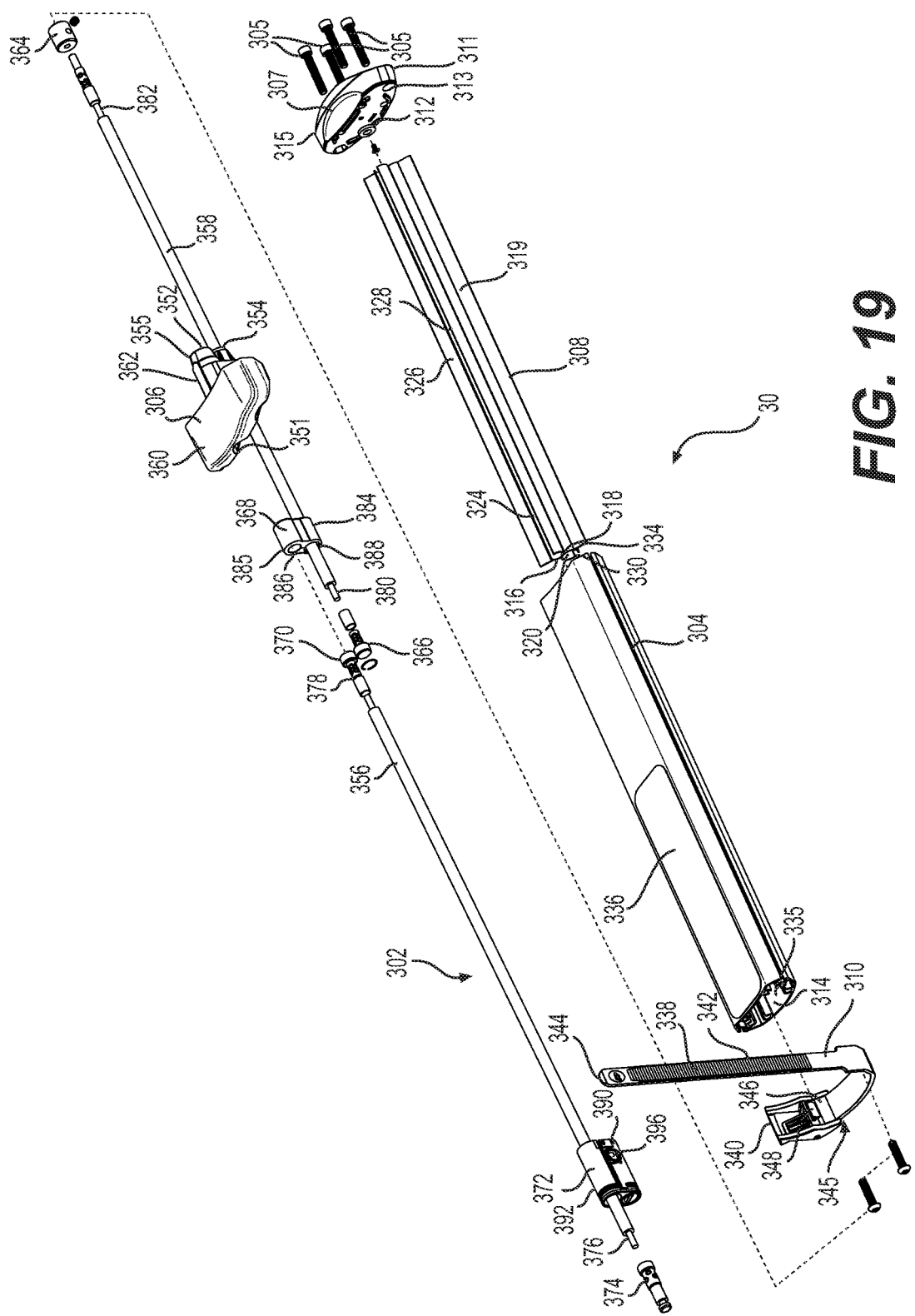
FIG. 19 is an exploded view of the rear tire tray assembly of the hitch-mounted carrier of FIG. 1.
Figure 20:
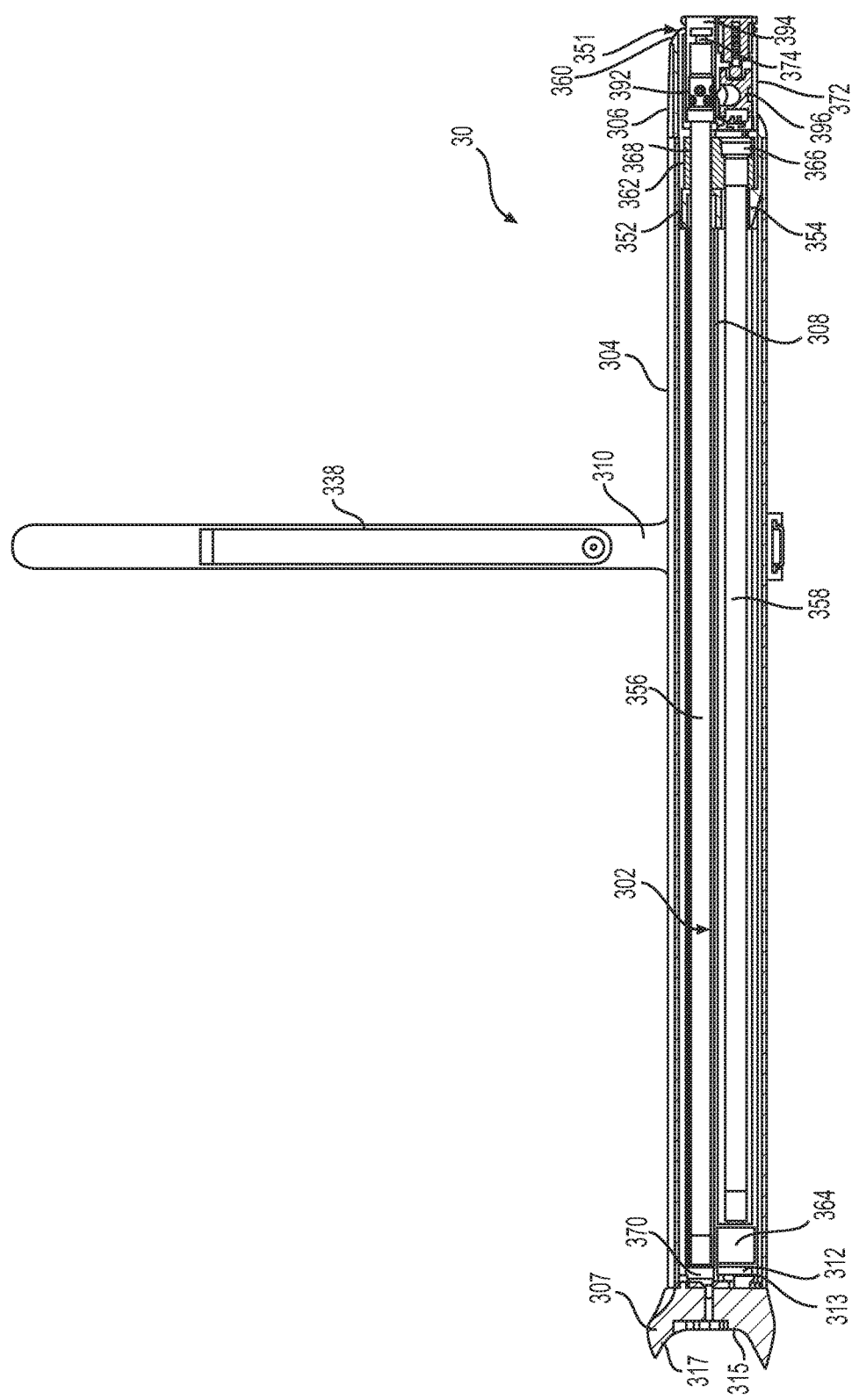
FIG. 20 is a cross section of the rear tire tray assembly taken along lines 20-20 of the hitch-mounted carrier of FIG. 1.

Referring now to FIG. 19-20, the rear tray assembly 30 may include a cable lock assembly 302, a tray housing 304, a rear cap 306, a rear arm connector cap 307, a lock cable guide 308, a tire strap assembly 310, and a magnet 312. The position of the rear tire tray assembly 30 relative to the support member 36 may allow for a conventional wheel or tire, such as rear tire 14 to be situated and balanced on the rear tire tray housing 304. Additionally, the rear tray assembly 30 may be lengthwise adjustable relative to the support member 36.

The rear arm connector cap 307 connects the rear tray assembly 30 to the support member 36. The rear arm connector cap 307 may be affixed to the rear tray housing 304 and support member 36 as illustrated herein by screws 305, but may be in any appropriate manner, such as utilizing fasteners, being snap-fitted, friction fitted, welded, adhered or may be monolithically formed or a combination thereof. The rear arm connector cap 307 includes a body 311 with a first end 313 and second end 315. Situated within the body 311 may be the magnet 312 on the first end 313. The body 311 may include a curved surface 317 to better fit the circular sides 38, 39 of the support member 36.

The tray housing 304 may be tubular and may include a lengthwise bore 314 for which the cable lock guide 308 may be positioned inside. The cable lock guide 308 includes a body 319 defining a first bore 316 further defining a first cylindrical inner surface 318 and a second bore 320 defining a second cylindrical inner surface 322. The first bore 316 situated atop the other bore 320. The first bore 316 may include a lengthwise top opening 324 along at least a portion of the first bore 316 that defines side surfaces 326, 328. Likewise, the second bore 318 may include a lengthwise lower opening 330 along at least a portion of the second bore 320 that defines side surfaces 332, 334. The side surfaces 326, 328, 332, 334 may engage four corners of an inner surface 335 defined by the bore 314 of the housing, so as to align and guide the cable lock assembly 302. In the illustrated example, the cable lock guide 308 may be substantially x-shaped in cross section.

Figure 21:
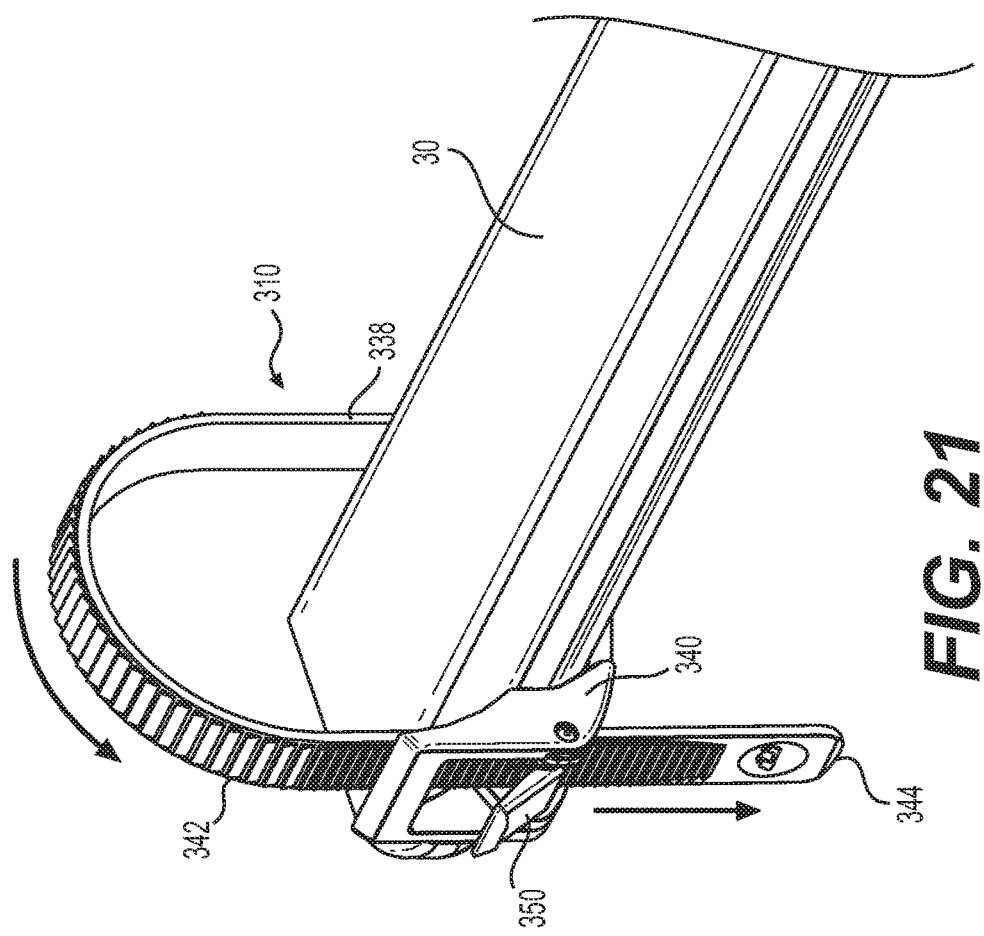
FIG. 21 is a magnified view of the attachment member assembly.
Figure 22:
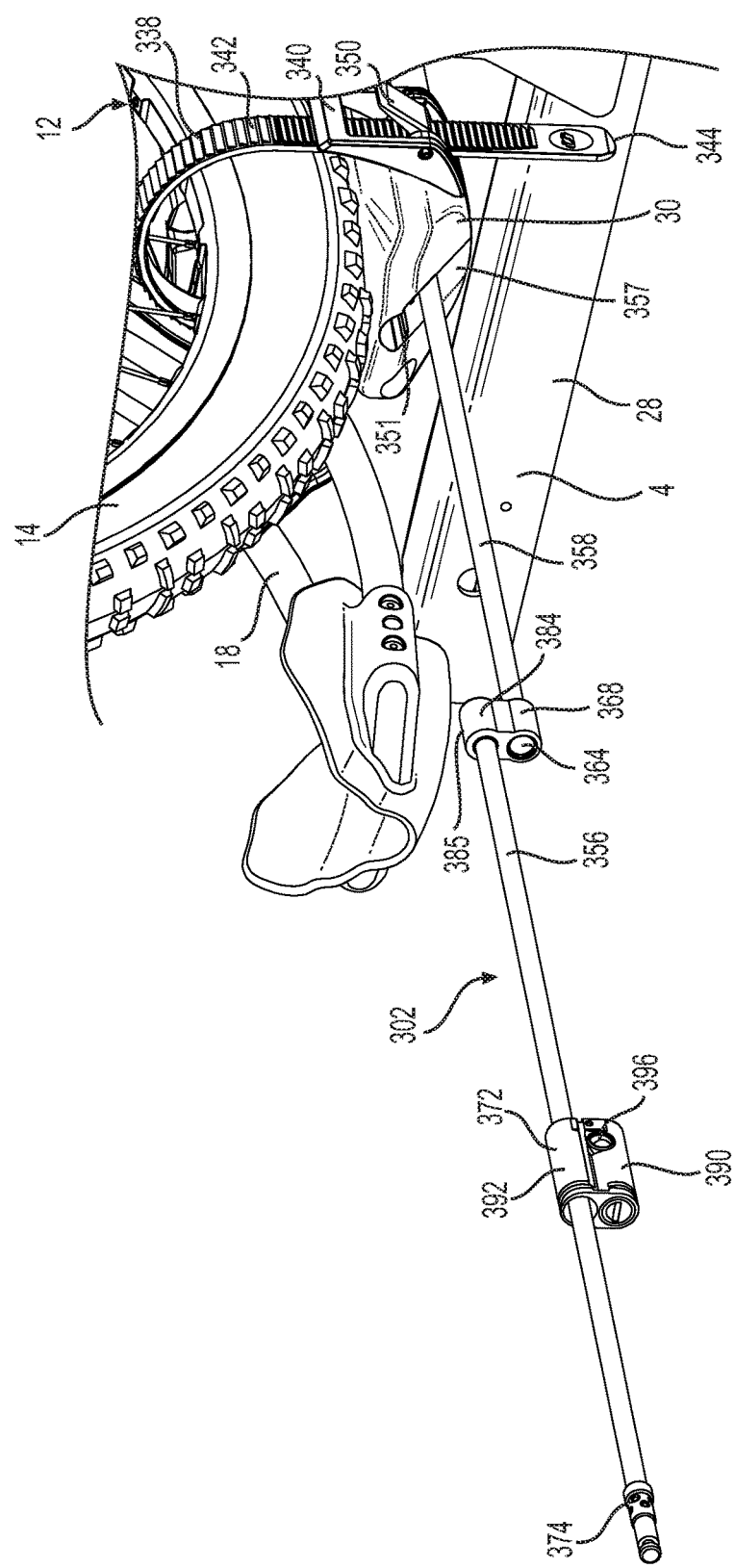
FIG. 22 is a perspective view of the lock and cable assembly with portions of the hitch-mounted carrier of FIG. 1 cut away.

The rear tray housing 304 includes an outer surface 336 for which the tire strap assembly 310 may be affixed to. The tire strap assembly 310 may be attached in any appropriate manner, such as utilizing fasteners, being snap-fitted, friction fitted, welded, adhered or may be monolithically formed or a combination thereof to the rear tray housing 304. It is foreseen that the strap assembly may also be housed on the front tire tray assembly 18 or the support member 36. It is foreseen that the tire strap assembly 310 may be adjustable to different locations on the rear tire tray housing 304 to fit different length tires. The strap assembly 310 may include a strap portion 338 and a clamp, ratchet, or buckle assembly 340. The strap portion 338 may include ridges 342. The ridges 342 may increase in quantity as the ridges 342 approach a first end 344. The buckle assembly 340 may be situated at the second end 345 of the strap portion 338 and may include a pass through aperture 346 and a pawl 348. The strap portion 338 may be slotted through the aperture 346 and the pawl 348 will engage the ridges 342 in a mating-like manner (FIG. 21). The buckle assembly 340 may further include a clamp 350, such that the pawl 348 may be locked into position. The tire strap assembly 310 would thereby capture a conventional wheel or tire, such as rear tire 14 that may be situated and balanced on the rear tire tray housing 304 (FIG. 22). Likewise, the clamp 350 may be released, so that the strap portion 338 may be removed from the pass through aperture 346.

The rear cap 306 may be affixed to the rear tray housing 304 in any appropriate manner, such as utilizing fasteners, being snap-fitted, friction fitted, welded, adhered or may be monolithically formed or a combination thereof. The rear cap 306 may include a body 360 and a projection portion 362, wherein the projection 362 may be positioned within the bore 314 of the rear tray housing 304. The rear cap 306 may include a pass though bore or recession 351. The bore 351 has two exits 352, 354, on an end 355, which pass through the projection portion 362 of the rear cap 306 and may align or run parallel to the first and second bores 316, 318 of the cable lock guide 308, such that cable lock upper and lower cords 356, 358 may pass through said exits 352, 354 and bores 316, 318, respectively (FIG. 21). The projection 362 may act as a stop for the lower cord 358 as will be further explained below.

Figure 23:
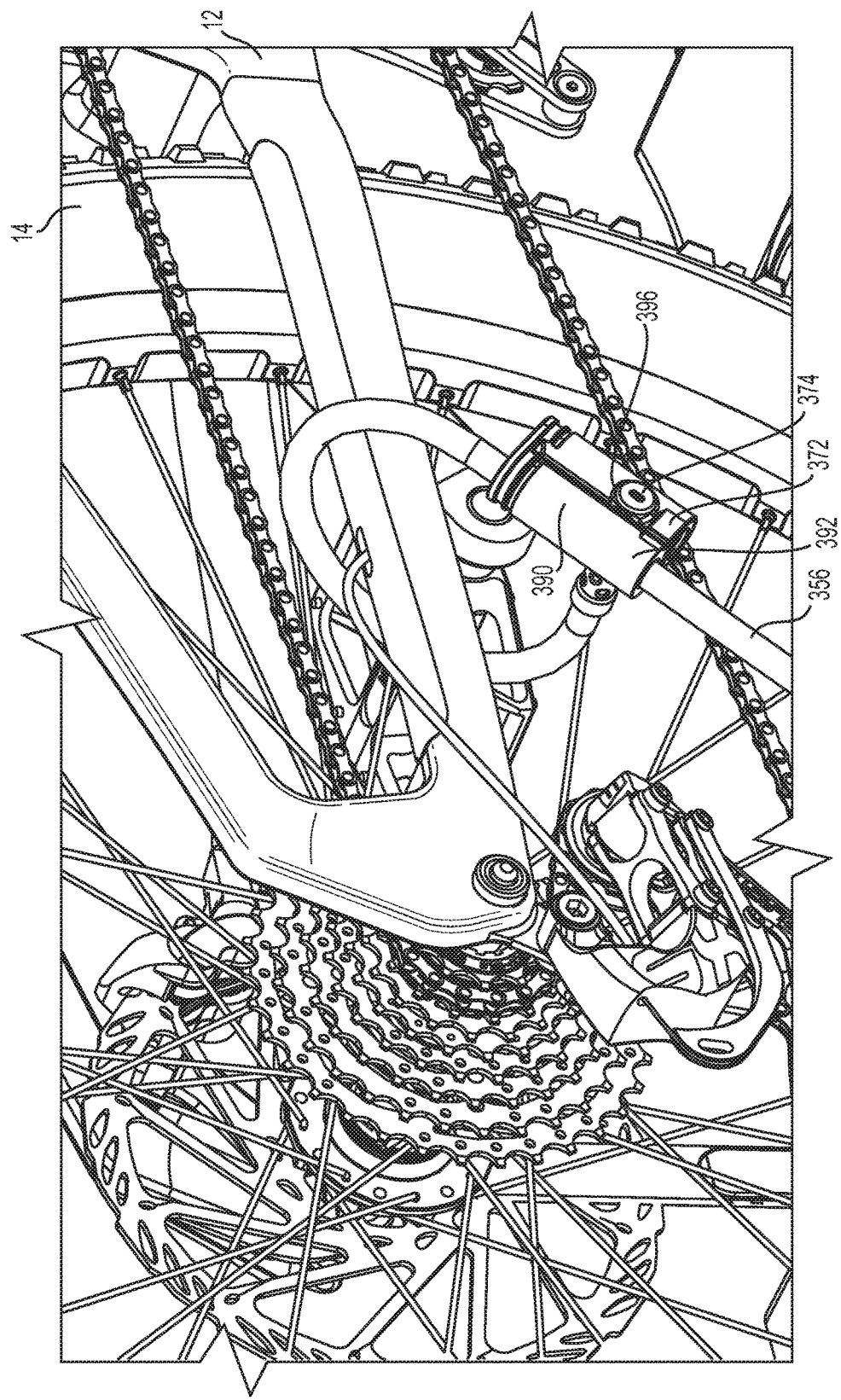
FIG. 23 is a magnified view of the lock and cable assembly in use with portions cut away.

The cable lock assembly 302 may include the upper cord 356, the lower cord 358, a lower cable first end piece 364, a cable tip 366, a slider 368, an upper cable end piece 370, a lock 372, and a latch tip 374. The cable lock assembly upper cord 356 being cylindrical in shape and elongate in a traverse direction. The upper cord 356 may include the latch tip 374 at a first end 376 and upper cable end piece 370 at a second end 378. The lower cord 358 also being cylindrical in shape and elongate in a traverse direction. The lower cord 358 may include the cable tip 366 at a first end 380 and lower cable end piece 364 at a second end 382. The cords 356, 358 may be made from hardened iron, steel or the like and may be chain linked with or without an elements protective (anti-corrosion) covering. The cords 356, 358 are illustrated as being stacked and parallel to one another running in a direction traverse to the longitudinal direction L. The lower cord 358 being slightly shorter in length than the upper cord 356 (FIG. 21). The lower cable end piece 364 having a larger diameter than the diameters of the upper and lower cords 356, 358 and the lower bore 354 of the rear cap, such that the lower cable end piece 364 acts as a stop, such that the lower cord 358 does not pass completely through the rear cap 306 (FIG. 23). The lower end piece 364 may be comprised or made of a ferrous material, such that the magnet 312 is attracted to the lower end piece 364 (FIG. 21). It should be appreciated that the magnetic strength of the magnet is envisioned to restrict the falling out of the cable lock assembly 302, and not strong enough to limit the slideability or maneuverability of the lower cord 358 within the rear tray housing 304, as will be described below.

The slider 368 may include a body 384, the body 384 having an outer surface 385 that may be cylindrically shaped with an oval cross section. The body 384 may be situated within the bore 351 when in a non-use configuration. The body 384 defines a first upper bore 386 and a second lower bore 388. The first upper bore 386 may allow the upper cord 356 to pass through and be slideable with respect thereto. The upper cable end piece 370 may be cylindrically shaped with a larger diameter than the upper cord 356 (FIG. 21). The diameter of the first upper bore 386 may be large enough for the upper cord 356 to slide therewith, while the upper cable end piece 370 may be too large, such that the slider 368 acts as a stop, wherein the upper cord 356 does not pass completely through. Likewise, the second lower bore 388 may allow the lower cord 358 to pass through and be slideable with respect thereto. The cable tip 364 may be cylindrically shaped with a larger diameter than the lower cord 358 (FIG. 21). The diameter of the second lower bore 388 may be large enough for the lower cord 358 to slide therewith, while the cable tip 364 may be too large, such that the slider 368 acts as a stop, wherein the lower cord 358 does not pass completely through. The slider 368 may also be positioned within the first and second bore 351 of the rear cap 306 and may also be slideable with respect to the bore 351.

The lock 372 may include a body 390 with an outer surface 398, which may be an elongated cylinder with an oval cross section. The body 390 may be situated within the bore 351 and may engage the slider 368 when in a non-use configuration (FIG. 20). The body 390 has an upper portion 392, wherein a pass through bore 394 may be situated longitudinally. Located below the bore 394 may be a locking mechanism 396. The latch tip 374 of the upper cord 356 may be positioned within the bore 394 such that the upper cord 356 may be slideable within the bore 394. The latch tip 374 is illustrated as having a larger diameter than the upper cord 356, such that the bore 394 acts as a stop in one direction, such that the upper cord 356 does not pass entirely through the bore 394 (FIG. 21). The latch tip 374 may interact with the locking mechanism 396 to lock the upper cord 356 and thereby locking the cable lock assembly 302 to the bike 12 (FIG. 23).

Referring to FIG. 22, it is foreseen that the bore 351 of the rear cap 306 may have a bottom opening 357 which would allow for the easy gripping capacity of the cable lock assembly 302 and potentially the slider 368. In a use configuration, the cable lock assembly 302 may be pulled out from the rear tray housing 304 and either locked to one bike 12 (FIG. 23) or multiple bikes 12, 12' (FIG. 24). It is foreseen at least two cable locking assemblies (not shown) could be combined to create a lock and latch system. In the use configuration, the upper cable end piece 370 may stop, limit, restrain, or restrain the length manipulation of the upper cord 356 and both the lower cable end piece 364 and cable tip 366 may act as stops to limit, restrain, or restrict the length manipulation of the lower cord 358 when pulling out the cable lock assembly 302. It is foreseen that the cable lock assembly 302 may also be housed on the front tire tray assembly 18 or the support member 36.

Figure 25:
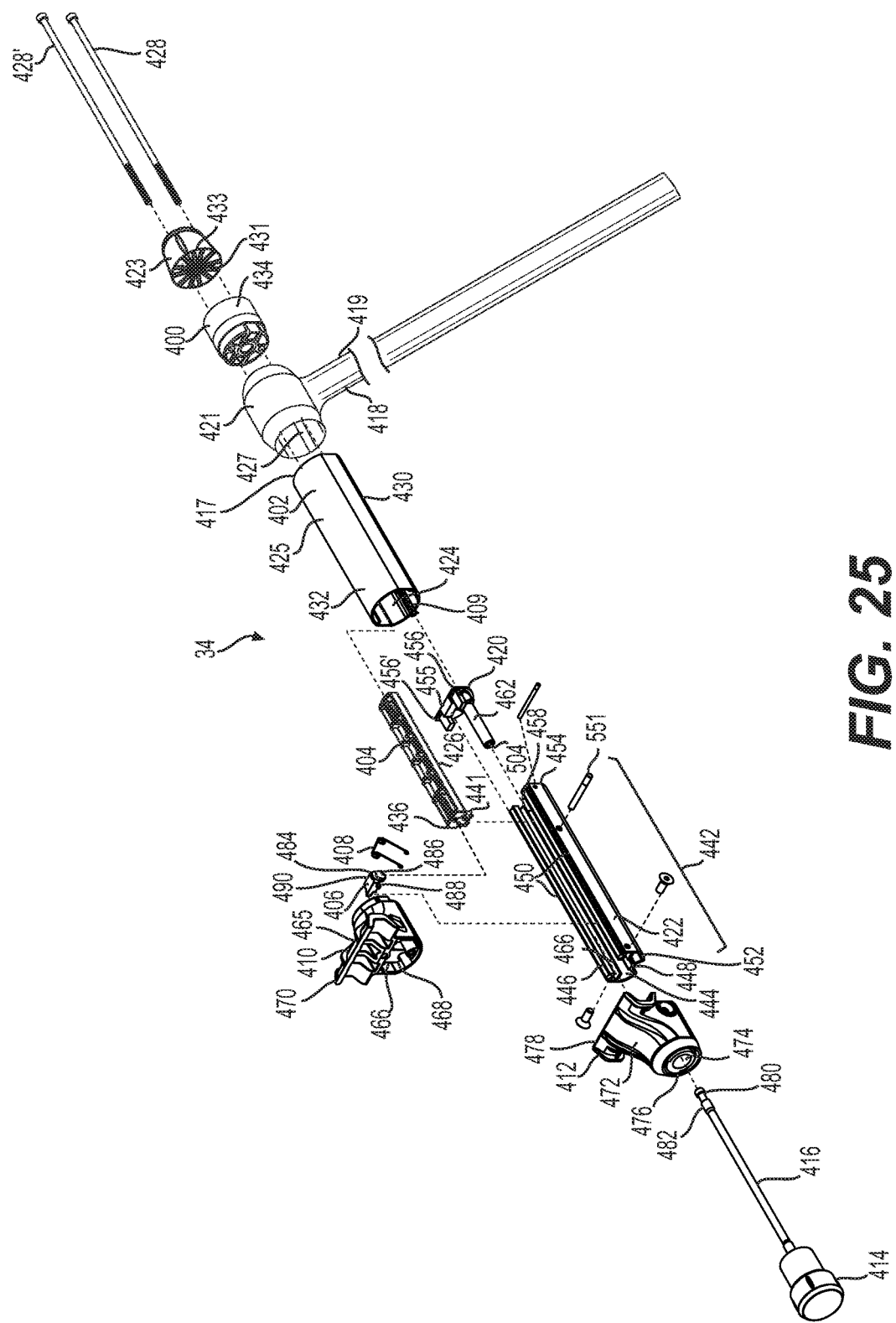
FIG. 25 is an exploded view of the bike dock assembly of the hitch-mounted carrier of FIG. 1.
Figure 26:
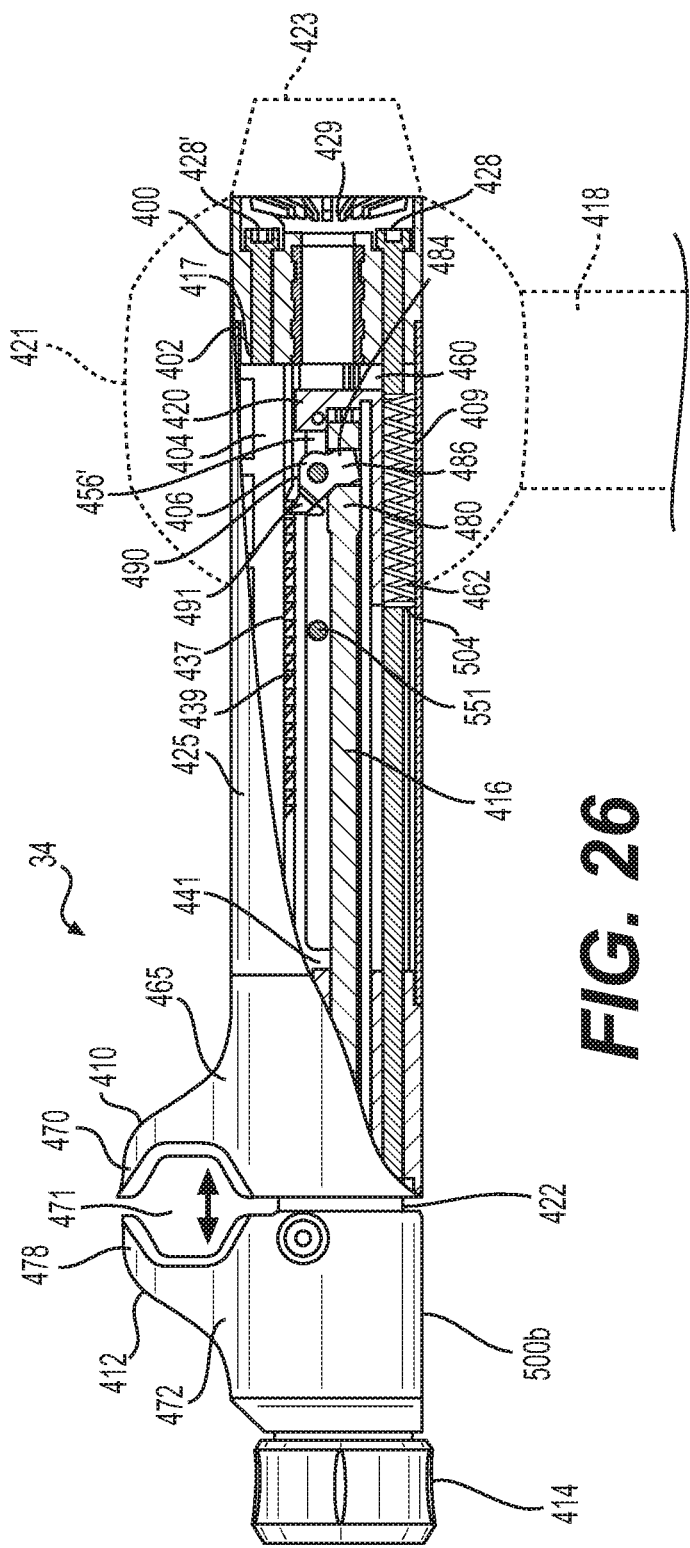
FIG. 26 is a side view of the bike dock assembly of the hitch-mounted carrier of FIG. 1. in a closed position with portions shown in phantom.
Figure 27:
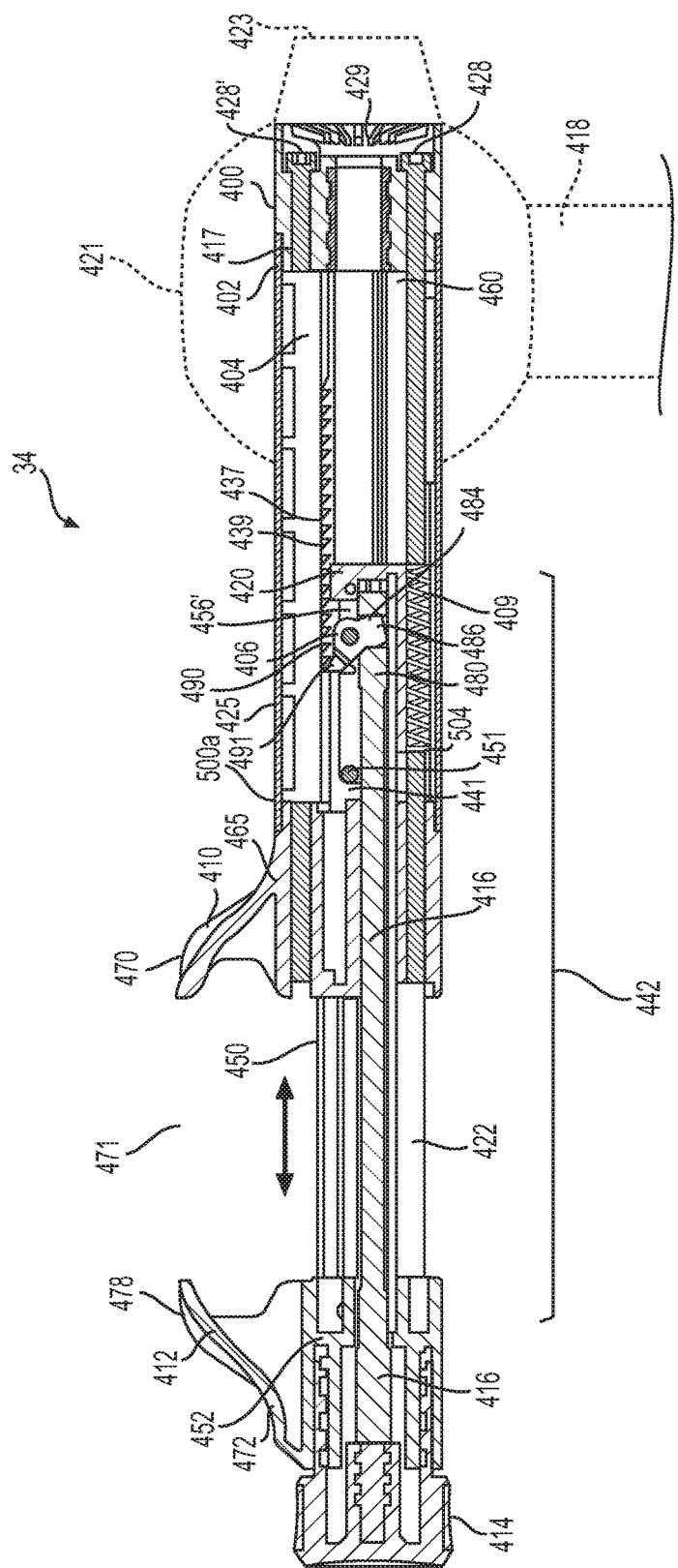
FIG. 27 is a cross sectional view of the bike dock assembly of the hitch-mounted carrier of FIG. 1 in an open position.

Referring to FIGS. 25-27, the bike docking assembly 34 may include a rear cap 400, a docking assembly housing 402, a ratchet rack 404, a ratchet pawl 406, a dual torsion spring 408, an ejector spring 409, an inside clamp 410, an outside clamp 412, a knob 414, a rod 416, a pivot assembly 418, an end piece 420, and an inner tube (also referred to as clamp member) 422. The docking assembly housing 402 may be cylindrically shaped along a traverse direction (to the longitudinal direction L) defining an outer surface 425 with a central bore 424 defining an inner surface 426.

The rear cap 400 may be cylindrically shaped and at least a portion of the rear cap may be situated within the central bore 424 of the docking assembly housing 402 at an end 417 thereof. In the illustrated embodiment, the rear cap 400, the outside clamp 412, the ratchet rack 404 are all fastened or attached together by screws 428, 428'. The screws 428, 428' are illustrated as being identical and are positioned parallel with the docking assembly housing 402. One screw 428 may be positioned along a bottom portion 430 of the docking assembly housing 402, and the other screw 428' may be positioned along a top portion 432 docking assembly housing 402.

Figure 28:
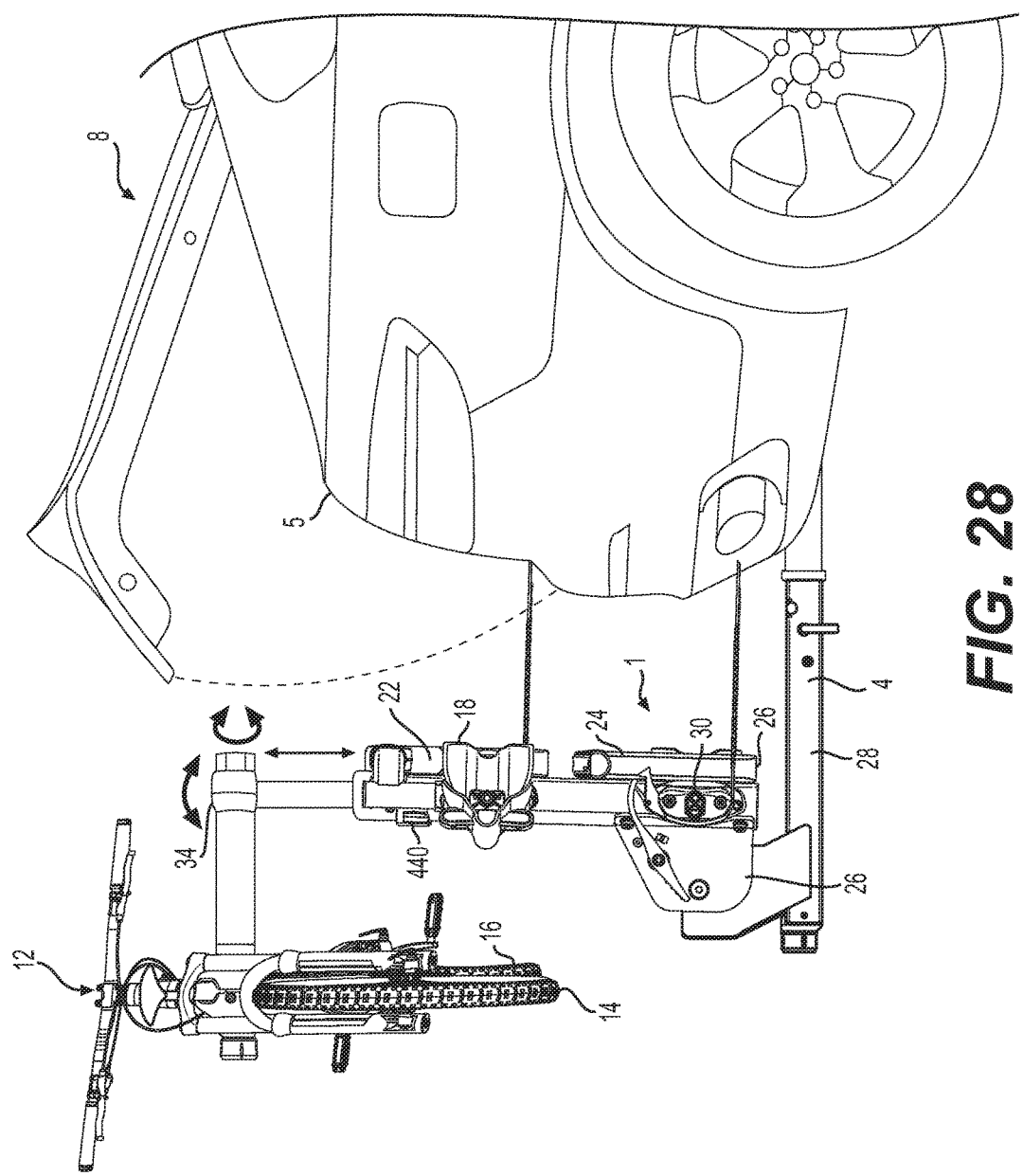
FIG. 28 is a side view of the hitch-mounted carrier of FIG. 1 with the bike dock assembly rotated outward and in an open position.

The pivot assembly 418 may allow the bike docking assembly 34 to rotate about the support member 36 or the longitudinal direction L, as well as the traverse direction (to the longitudinal direction L) and allow for longitudinal extension and retraction (FIGS. 8 and 28). The pivoting assembly 418 includes an elongate cylindrical portion 419 being parallel to the longitudinal direction L, a tubular portion 421 running traverse to the elongate portion 419, and a knob 423. The docking assembly housing 402 is rotatable about the pivoting assembly 418. The elongate portion 419 may be attached to the tubular portion 421 and positioned within the support member 36 near a top 435 thereof. The tubular portion 421 may include a bore 427 for which at least a portion of the docking housing 402 may be situated therein. The outer surface 425 may be slideable in a rotational and traverse direction while within the tubular portion 421. The rear cap 400 has pockets or depressions 429 that mate with ridges 431 located on a side 433 of the knob 423. When the knob 423 interacts with the rear cap 400, such that when the ridges 431 mate within the pockets 429, the knob 423 blocks rotation of the docking assembly housing 402, the clamps 410, 412, and the knob 414.

Figure 6:
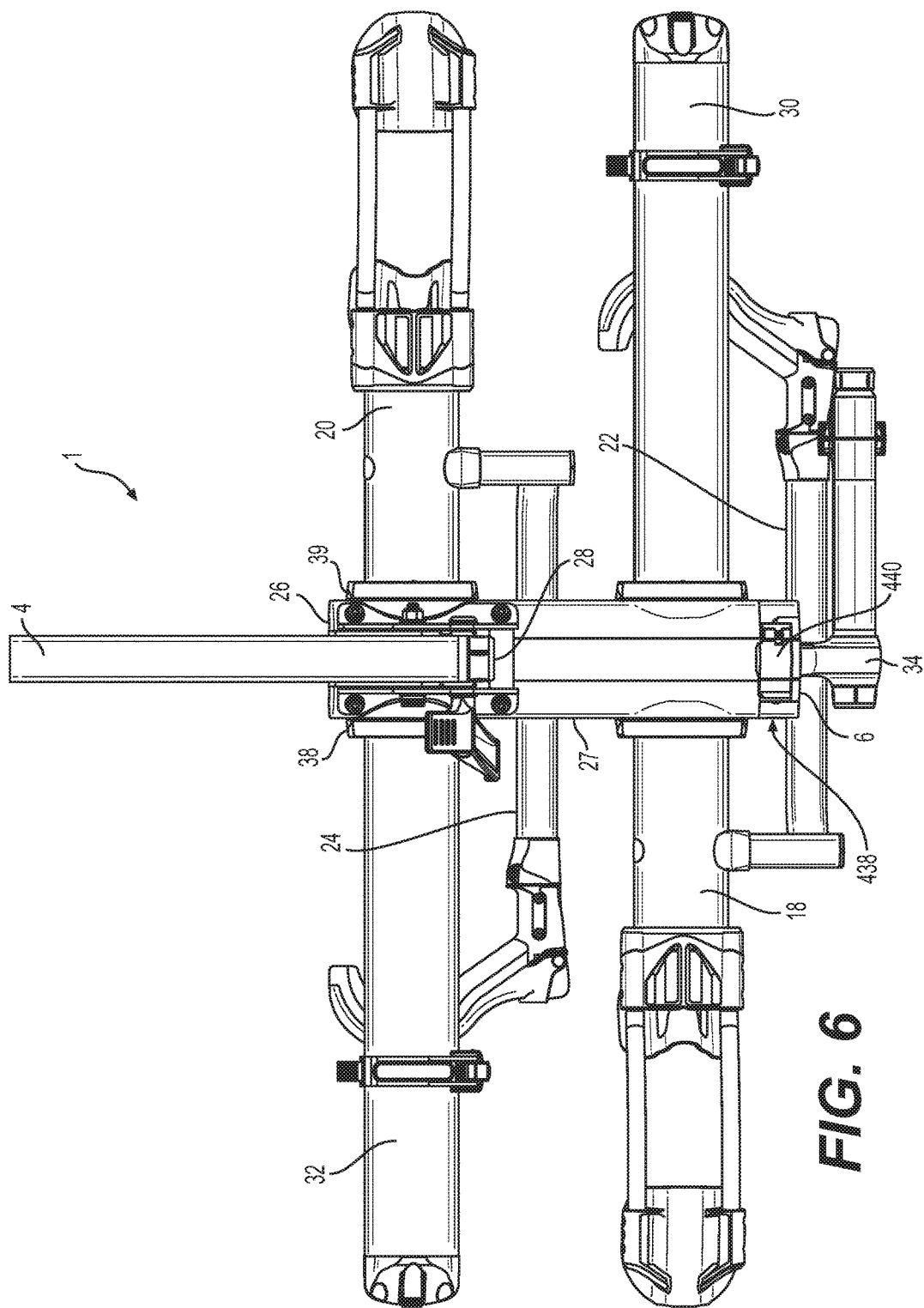
FIG. 6 is a bottom view of the hitch-mounted carrier of FIG. 1.
Figure 7:
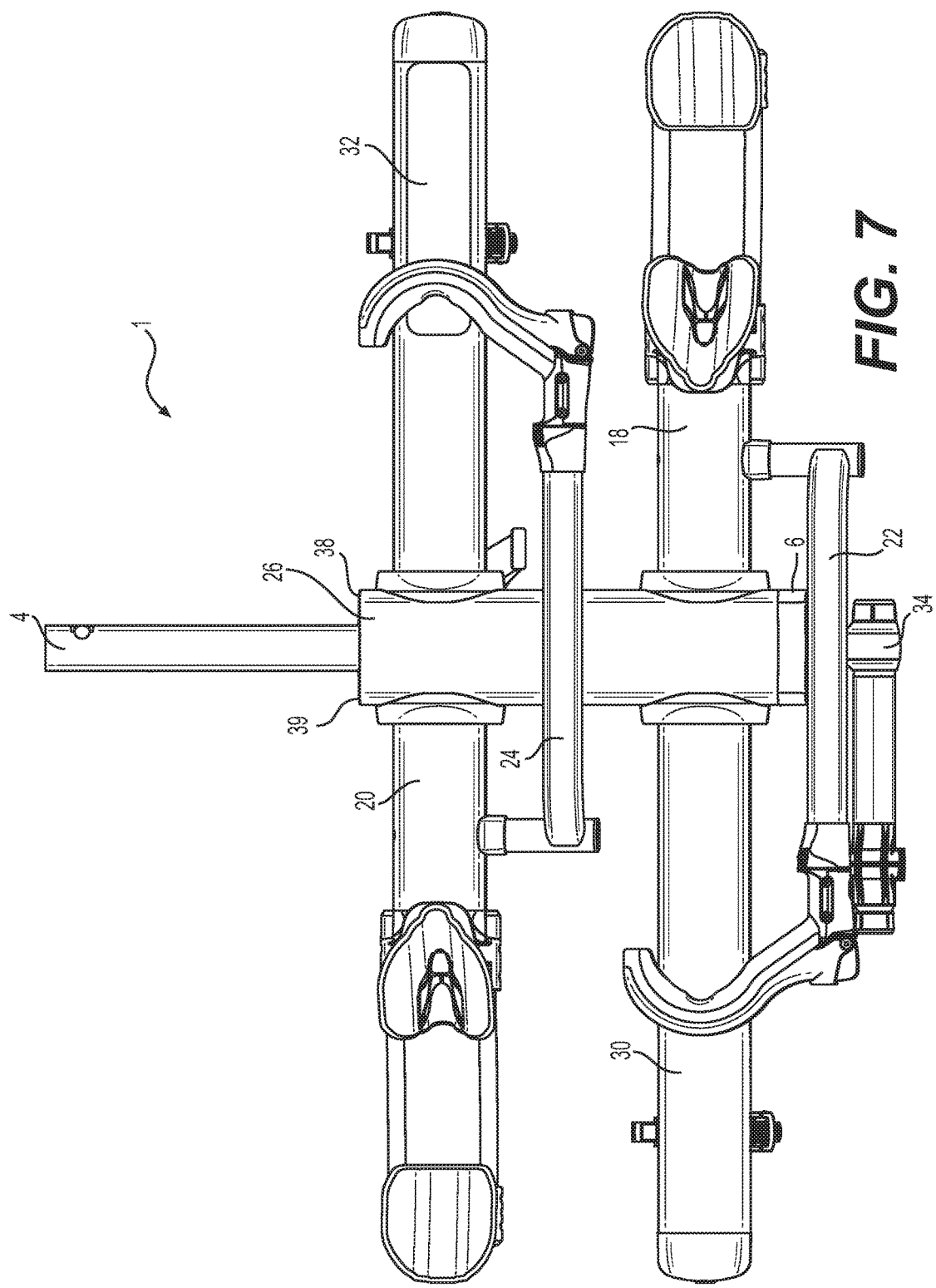
FIG. 7 is a top of the hitch-mounted carrier of FIG. 1.

The pivoting assembly 418 may further include a latch and locking assembly 438, wherein the elongate portion 419 may be unlocked and locked by a latch 440 (FIG. 6). The latch and locking assembly 438 is envisioned to attach to the support member 36 at the top 435 thereof. The latch and locking assembly 438 would allow for capture of the elongate portion, therein allowing longitudinal movement in lengthwise adjustment and retractions of the docking assembly 34 (FIG. 28).

The ratchet rack 404 may be an elongate four sided monolithic piece in a traverse direction and positioned within the docking assembly housing 402. A top side or surface 436 may include a rounded or curved portion to aid in positioning along the inner surface 426 of the docking assembly housing 402. Side 437 is opposed to the side 436 and may include at least a portion of a gear, teeth, bumps, or ridges 439 and a protrusion 441.

The inner tube 422 may be elongate with a semi-circular or U-shaped cross section for a predetermined length 442 in the traverse direction. The inner tube 422 may include a central bore 444 with a top opening 446 running at least partially the predetermined length 442 of the inner tube 422. The at least a portion of a gear, teeth, bumps, or ridges 439 being positioned within the top opening 446. The inner tube 422 may further include a groove 448 for which the fastener 428 may pass through. The groove 448 of the inner tube 422 may create a seating surface 466 for which the rod 416 may engage or rest upon. The inner tube 422 may include a slide bumper 450 at or near a top surface thereof. The slide bumper 450 interacting with the inside clamp 410 as will be further described below. The inner tube 422 may be attached to the outer clamp 412 by any appropriate manner—including, without limitation via fasteners, screws, bolts, welding, adhering or the like on a first or outer end 452. Likewise, the inner tube 422 may be attached to the end piece 420 by any appropriate manner—including, without limitation via fasteners, screws, bolts, welding, adhering or the like on a second or inner end 454.

The end piece 420 may include a body 455 having protrusions 456, 456' which run parallel to the inner tube and situate within grooves 458, 458' running within and parallel to the inner tube 422. The end piece body 455 substantially covers the inner tube end 454 and has a substantially U-shaped outer surface 460. The end piece 420 may further include a tubular portion 462, wherein the tubular portion 462 may situate within the groove 448 of the inner tube 422. The tubular portion 462 may house the ejector or compression spring 409 as will be further described below.

The inner clamp 410 may include body 465 having a U-shaped (or W-shaped) bore 466 defining a U-shaped (or W-shaped) inner surface 468 for which the inner tube 422 may be slideable with respect thereto. The slide bumper 450 may engage the inner surface 468. The body 465 may be further defined as having a curved hook-like protrusion 470. The outer clamp 412 may include a body 472 having a central bore 474 defining an inner surface 476 for which the rod 416 may pass therethrough. The outer clamp 412 may include a curved hook-like protrusion 478, which is a mirror image of the protrusion 470, such that the hook-like protrusions 470,478 create a familiar C-shaped clamping mechanism with a channel 471 there-between.

The knob 414 may be cylindrically shaped and may be connected to the rod 416 in any appropriate manner—including, without limitation via fasteners, screws, bolts, welding, adhering or the like. The knob 414 may allow the rod 416 to be rotated about the traverse direction. The rod 416 may be connected to the ratchet pawl 406 at an opposed end 480. The rod may include a circular groove 482 about which the ratchet pawl 406 may rest upon. It is foreseen that the end 480 of the rod 416 may interface with the ratchet pawl 406 in other manners, i.e. threads.

The ratchet pawl 406 may include a body 484 with two opposed arms 486, thereby creating a channel 488 there-between. The rod 416 positioned within the channel 488. On an opposed side or top surface 490 may be a pawl or tooth-like structure 491. The pawl 491 engaging and interacting with the at least a portion of a gear, teeth, bumps, or ridges 439 of the ratchet rack 404 to capture at least a portion of the inner tube 422 within the docking assembly housing 402 (FIGS. 26-27). The dual torsion spring 408 may be connected to the ratchet pawl 406 in any appropriate manner—including, without limitation via fasteners, screws, bolts, welding, adhering or the like. The dual torsion spring 408 may be biased to maintain the engagement of the pawl 490 to the at least a portion of a gear, teeth, bumps, or ridges 439 of the ratchet rack 404.

Referring now to FIGS. 26-27, the docking assembly 34 has an open position or configuration 500a (FIG. 27) and a closed position or configuration 500b (FIG. 26). To shift from the closed position 500b to the open position 500a, the knob 414 is rotated in one direction, this in turn puts pressure on the dual torsion spring 408 biasing the pawl 490 such that the ratchet pawl 406 is released from capture of the at least a portion of a gear, teeth, bumps, or ridges 439 of the ratchet rack 404. The ejector spring 409 is at a compressed state when the docking assembly 34 is in a closed position 500b, and when the pawl 406 is released from the at least a portion of a gear, teeth, bumps, or ridges 439 of the ratchet rack 404, then the compression spring 409 may expand to the full length to immediately extend the inner tube 422 until the pawl 406 may be stopped by the protrusion 441 of the ratchet rack 404 (FIG. 27). The inner tube 422 may also include a pin 501 that may be stopped by the protrusion 441.

To shift from an open position 500a to a closed position 500b, it may just take a force in the one direction to re-capture the pawl 406 in at least a portion of a gear, teeth, bumps, or ridges 439 of the ratchet rack 404 or the knob 414 and rod 416 combination may be rotated in the opposite direction to tighten the pawl 406 individually across the at least a portion of a gear, teeth, bumps, or ridges 439 of the ratchet rack 404 back to the closed position 500b. The difference in channel 471 length between the hook like protrusions 470,478 in a closed position 500b and an open position 500a may be based on the predetermined length 442 of the inner tube 422. As the pawl 460 is adjusted back to the closed position 500b, the ejection spring 409 is captured by an end 504 of the tubular portion 462 of the end piece 420 and begins to compress storing potential energy.

Referring to FIG. 28, it is envisioned that a portion of a bike 12 (i.e. a cross bar or seat bar) may be captured within the channel 471 between the hook like protrusions 470,478. The docking assembly 34 creates a holding position for a bike to allow for mechanical repair or adjustments of the bike above a ground. It is foreseen that the docking assembly 34 may be removeably coupled to the support member 36, so as to also be utilized with a separate stand.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. Further, it will be understood that certain features and subcombinations may be of utility and may be employed within the scope of the disclosure. Further, various steps set forth herein may be carried out in orders that differ from those set forth herein without departing from the scope of the present methods. This description shall not be restricted to the above embodiments.

It is to be understood that while certain forms of the present invention have been illustrated and described herein, it is not to be limited to the specific forms or arrangement of parts described and shown.

The invention claimed is:

1. A hitch-mounted bicycle carrier comprising:
   a hitch attachment assembly having opposed first and second ends;
   a support member rotatably coupled to the hitch attachment assembly first end for movement;
   a latch bar having a body pivotally attached to the support member, and a protrusion;
   at least two opposed plates connected to the hitch attachment assembly, each plate having a body, and at least one of the at least two plate bodies having at least two depressions;
   wherein the protrusion of the latch bar is configured to be temporarily captured in the at least two depressions of the at least two opposed plates; and
   a foot pedal connected to the body of the latch bar;
   wherein pivotal manipulation of the foot pedal pivots the latch bar to remove the protrusion of the latch bar from the at least two depressions; and
   wherein when the protrusion of the latch bar is removed from the at least two depressions, then the support member, latch bar and foot pedal may rotate with respect to the at least two opposed plates.

2. The hitch-mounted bicycle carrier of claim 1, wherein the support member and the hitch attachment assembly are configured to be manipulated into first and second configurations, the first configuration being where the hitch attachment assembly and the support member are substantially perpendicular, and a second configuration being where the hitch attachment assembly and the support member are substantially parallel.

3. The hitch-mounted bicycle carrier of claim 1, wherein the body of the plate having at least two depressions further comprises a seating surface, the seating surface enabling the support member and the hitch attachment assembly to be further configured to be manipulated into a third configuration, wherein in the third configuration the latch bar is positioned on the seating surface.

4. The hitch-mounted bicycle carrier of claim 3, wherein a support member position in the third configuration is at an acute angle from a support member position in the second configuration.

5. The hitch-mounted bicycle carrier of claim 1, further comprising a front tire tray assembly and a rear tire tray assembly being traverse to a direction of the support member, each tray assembly being located on opposed sides of the support member and each configured to position a wheel of a bike thereon.

6. The hitch-mounted bicycle carrier of claim 5, wherein the support member, hitch attachment assembly, front tire tray assembly and a rear tire tray assembly are constructed of at least one of: aluminum, carbon fiber, and plastic.

7. The hitch-mounted bicycle carrier of claim 5, further comprising a strap assembly, the strap assembly being positioned on the rear tire tray assembly and including a clamp and a strap.

8. The hitch-mounted bicycle carrier of claim 5 further comprising a cable lock assembly, the cable lock assembly being housed within the rear tire tray assembly and including a cable and a lock, wherein the cable passes through the lock to secure the cable and lock assembly, wherein the cable lock assembly further includes a slider having a body with first and second parallel apertures running through the body, and the cable of the cable lock assembly is comprised of at least first and second separate cords, wherein the first and second cords pass slideably through the respective first and second parallel apertures of the slider when the cable lock assembly is housed within the rear tire tray assembly.

9. The hitch-mounted bicycle carrier of claim 1, further comprising a torsion spring with one end thereof engaging the protrusion of the latch bar and biasing the latch bar in a direction, such that the protrusion of the latch bar is temporarily captured within the first and second depressions.

10. The hitch-mounted bicycle carrier of claim 1, wherein the hitch attachment assembly further comprises:
   a tubular housing having first and second halves, the tubular housing having an aperture for which a ball may be captured therein;
   a rotatable knob located at the first half of the housing and connected to a rod, the rod located within the tubular housing;
   a cam block located within the housing on the second half of the housing and being elongate and having a groove running parallel with the tubular housing, the groove having a ramp at a first cam block end, and wherein the ball engages the groove, the cam block also having an elongate aperture for which a bolt passes through; and wherein when the knob is rotated the cam block is shifted to and away from the knob and the ball rotates about the groove in an opposite direction from the cam block until at least one of the following occurs: the bolt engages a side of the elongate aperture and the ball engages the ramp.

11. The hitch-mounted bicycle carrier of claim 1, further comprises a docking assembly, the docking assembly rotatably coupled to the support member, the docking assembly comprising:
  a tubular housing with a first end and a second end;
  an inner portion positioned within the housing of the docking assembly;
  a ratchet pawl engaging ridges of a ratchet rack, the ratchet rack and pawl positioned within the housing of the docking assembly, the ratchet pawl connected to the inner portion and configured to hold the inner portion at a point along the ratchet rack wherein the ratchet pawl is temporarily captured in the ridges of the ratchet rack;
  a clamp assembly including a fixed jaw arm and moveable jaw, wherein the fixed jaw is connected to the tubular housing at the first end, and the moveable jaw is connected to the inner portion;
  a knob is connected to the moveable jaw of the clamp;
  a rod connected to the knob at a first end of the rod and to the ratchet pawl at a second end of the rod and positioned through the inner portion and the fixed and moveable jaws of the clamp, such that manipulation of the rod manipulates the ratchet pawl; and
  wherein the knob being configured to at least one of rotate and be manipulated inward to adjust the ratchet pawl along the ridges of the ratchet rack, thereby manipulating a distance between the fixed jaw and the moveable jaw of the clamp assembly by at least one of elongating the inner portion of the docking assembly and retracting the inner portion of the docking assembly.

12. The hitch-mounted bicycle carrier of claim 11, wherein the docking assembly further comprises a first torsion spring biasing the ratchet pawl in a direction, such that the ratchet pawl is temporarily captured within the ridges of the ratchet rack.

13. The hitch-mounted bicycle carrier of claim 11, wherein the knob of the docking assembly is a first knob and the docking assembly further comprises a second knob, the second knob being configured to restrict rotation of the tubular housing of the docking assembly.

14. A hitch-mounted bicycle carrier comprising:
  a hitch attachment assembly having opposed first and second ends;
  a support member rotatably coupled to the hitch attachment assembly first end;
  a front tire tray assembly being located along a first side of the support member and configured to position a wheel of a bike thereon;
  a rear tire tray assembly being located along a second side of the support member being opposed to the first side, the rear tire tray assembly being aligned with the front tire tray assembly and configured to position a wheel of a bike thereon; and
  a docking assembly, the docking assembly rotatably coupled to the support member, the docking assembly including:
  a tubular housing with a first end and a second end;
  an inner portion positioned within the housing of the docking assembly;
  a ratchet pawl engaging ridges of a ratchet rack, the ratchet rack and pawl positioned within the housing of the docking assembly, the ratchet pawl connected to the inner portion and configured to hold the inner portion at a point along the ratchet rack wherein the ratchet pawl is temporarily captured in the ridges of the ratchet rack;
  a clamp assembly including a fixed jaw arm and moveable jaw, wherein the fixed jaw is connected to the tubular housing at the first end, and the moveable jaw is connected to the inner portion;
  a knob is connected to the moveable jaw of the clamp;
  a rod connected to the knob at a first end of the rod and to the ratchet pawl at a second end of the rod and positioned through the inner portion and the fixed and moveable jaws of the clamp, such that manipulation of the rod manipulates the ratchet pawl; and
  wherein the knob being configured to at least one of rotate and be manipulated inward to adjust the ratchet pawl along the ridges of the ratchet rack, thereby manipulating a distance between the fixed jaw and the moveable jaw of the clamp assembly by at least one of elongating the inner portion of the docking assembly and retracting the inner portion of the docking assembly.

15. The hitch-mounted bicycle carrier of claim 14, wherein the docking assembly is removeably coupled to the support member and configured to be utilized with a separate stand.

16. An assembly for docking a bicycle to a carrier, the assembly comprising:
  a housing with an open first end;
  a first clamp attached to the first end of the housing,
  a clamp member slidably disposed in the first end of the housing, with a first end of the clamp member disposed inside the housing and a second end of the clamp member disposed outside the housing,
  a second clamp attached to the clamp member at a point outside the housing;
  a ratchet rack attached to and within the housing;
  a knob rotatably attached to the clamp member, the knob connected to a first end of a rod, the rod extending along the clamp member;
  a ratchet pawl pivotally disposed between the clamp member and the ratchet rack, and engaged by the rod;
  a torsion spring biasing the ratchet pawl to engage the ratchet rack;
  wherein rotation of the knob in a first direction pivots the ratchet pawl to disengage it from the ratchet rack, and rotation of the knob in a second direction allows the ratchet pawl to pivot to engage with the ratchet rack.

17. The assembly of claim 16 wherein the rotation of the knob translates the rod within the housing.

18. The assembly of claim 16 wherein the rod is provided with an annular groove that pivots the ratchet pawl when the knob is rotated.

19. The assembly of claim 18 wherein the ratchet pawl comprises a ratchet tooth and at least one arm, wherein the ratchet tooth engages the ratchet rack, and the at least one arm engages the annular groove in the rod.

20. The assembly of claim 16 further comprising an ejector spring disposed between an end cap and the housing, the ejector spring for urging the outer clamp away from the inner clamp when the ratchet pawl disengages from the ratchet pawl.

* * * * *